United States Patent
Huber

(10) Patent No.: US 6,542,443 B1
(45) Date of Patent: Apr. 1, 2003

(54) EFFICIENT LINEARIZATION OF SATURATION CHANNELS

(75) Inventor: William D. Huber, Morgan Hill, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/692,503

(22) Filed: Oct. 18, 2000

Related U.S. Application Data

(63) Continuation-in-part of application No. 09/325,012, filed on Jun. 2, 1999.
(60) Provisional application No. 60/160,137, filed on Oct. 18, 1999.

(51) Int. Cl.$^7$ ................................. G11B 11/00
(52) U.S. Cl. .................. 369/13.02; 369/47.15; 369/59.1
(58) Field of Search .................... 369/13.02, 13.05, 369/30.03, 44.29, 44.27, 59.11, 59.12, 47.15

(56) References Cited

U.S. PATENT DOCUMENTS

| | | | |
|---|---|---|---|
| 2,292,387 A | | 8/1942 | Markey et al. |
| 4,202,017 A | * | 5/1980 | Geffon et al. ................ 360/45 |
| 4,965,873 A | | 10/1990 | White |
| 5,124,861 A | * | 6/1992 | Shimotashiro et al. ........ 360/39 |
| 5,319,502 A | * | 6/1994 | Feig ........................... 360/46 |
| 5,475,672 A | * | 12/1995 | Carvennec .............. 369/275.3 |
| 5,878,015 A | | 3/1999 | Schell et al. |
| 5,959,948 A | | 9/1999 | Oshima |
| 6,058,081 A | * | 5/2000 | Schell et al. ............. 369/44.27 |
| 6,178,144 B1 | * | 1/2001 | Huber .......................... 369/13 |
| 6,208,594 B1 | * | 3/2001 | Huber et al. .................. 369/13 |

FOREIGN PATENT DOCUMENTS

| | | |
|---|---|---|
| EP | 0 051 343 A | 5/1982 |
| EP | 0 139 925 A | 5/1985 |
| EP | 0 522 543 A | 1/1993 |
| EP | 0 631 280 A | 12/1994 |
| JP | 07 220317 A | 8/1985 |
| JP | 62 049781 A | 3/1987 |
| JP | 06 195786 A | 7/1994 |
| JP | 07 029239 A | 1/1995 |
| SU | 1 569 876 A | 6/1990 |

OTHER PUBLICATIONS

Anonymous: "Maximizing the Output from Buried Servo Write Current Shaping", IBM Technical Disclosure Bulletin, vol. 24, No. 3, Aug. 1981, pp. 1479–1480.

"AC–Bias Magnetic Recording Of Data", IBM Technical Disclosure Bulletin, vol. 32, No. 7, Dec. 1, 1989, pp. 286, 288.

Letter to Don Huber dated Apr. 1997, including "The Hedy Lamarr patent saga in spread–spectrum communications" w/attachment, 9 pp.

(List continued on next page.)

*Primary Examiner*—Tan Dinh
(74) *Attorney, Agent, or Firm*—Kirk A. Cesari

(57) ABSTRACT

A data storage system achieves improved bandwidth efficiency using a modulated recording signal, channel linearization, and a compressor circuit for compressing peak amplitude of the recording signal. In a preferred embodiment, quadrature amplitude modulation and demodulation is utilized. Another embodiment achieves improved bandwidth efficiency using a recording medium having a substantially rectangular magnetic flux versus magnetic field intensity hysteresis characteristic and a substantially rectangular Kerr rotation versus magnetic field intensity hysteresis characteristic. Yet another embodiment achieves improved bandwidth efficiency using a storage medium having a substantially abrupt flux transition.

8 Claims, 23 Drawing Sheets

OTHER PUBLICATIONS

Couey, Anna; Internet Article Entitled "Recognition At Last: Hedy Lamarr & George Antheil Receive EFF Award" dated Jul. 1, 1998; 2 pp.; http://www.microtimes.com/166/coversidebar.html.

Couey, Anna; Internet Article Entitled "The Birth of Spread Spectrum: How 'The Bad Boy of Music' and 'The Most Beautiful Girl in the World' Catalyzed a Wireless Revolution—in 1941" dated Jul. 1, 1998; 6 pp; http://www.microtimes.com/166/coverstory166.html.

Viterbi, Andrew J.; *CDMA Principles of Spread Spectrum Communication*; Addision–Wesley Longman, Inc., 1995; pp. vii–xi.

Article Entitled, The Historian's Column; IEEE Information Theory Society Newsletter; Dec. 1998; pp. 14 and 15.

Slaughter, T., Editor.; Elements of a Digital Communications System and Information Theory 1983; pp. 71–73.

Huber, W. Don; "A Signal Processing Advantage Associated With Magneto–Optical Data Channels"; Manuscript dated Apr. 1, 1997; 3 pp.

Sklar, Bernard; *Digital Communications: Fundamentals and Application*; Prentice Hall, 1988, pp. 536–545.

Huber, W. Don; Manuscript Entitled "Addendum: Efficient Linearization of Saturation Channel"; dated Sep. 30, 1999; 1 page.

Seagate Technology, Inc. Confidential Interoffice Memorandum (with Attachments); To: Tom Murnan; From: Bruce Johnson; Dated Oct. 4, 1992; Subject: Frequency Domain Recording (FDR); 15 pp.

French, Catherine A., et al.; Article Entitled "Bounds on the Capacity of a Peak Power Constrained Gaussian Channel;"; IEEE Transactions on Magnetics, vol. 24, No. 5, Sep. 1988; pp. 2247–2262.

Bertram, H. Neal; Article Entitled "Long Wavelength AC Bias Recording Theory" IEEE Transactions on Magnetics, vol. Mag 10, No. 4, Dec. 1974; pp. 1039–1048.

Eiling, Aloys; Article Entitled "Computer Simulation of Bias Recording"; IEEE Transactions on Magnetics, vol. 24, No. 5, Sep. 1988; pp. 2235–2246.

Jacoby, George V.; Article Entitled "High Density Recording with Write Current Shaping" IEEE Transactions on Magnetics, vol. Mag–15 No. 3, Jul. 1979; pp. 1124–1130.

McCown, Donald P., et al.; Article Entitled "Comparative Aspects of AC Bias Recording"; IEEE Transactions on Magnetics, vol. Mag–17, No. 6, Nov. 1981; pp. 3343–3345.

Mintzer, Fred, et al. Research Report Entitled "Experiments on the use of FDDT for AC–Bias Disk Recording"; IBM research Division; RC 9429 (#41644) Jun. 16, 1982; Communications/Engineering technology; 6 pp. and pp. 7–19.

Lin, Gang Herbert, et al.; Article Entitled "Transition Noise Spectral Measurements in Thin Film Media"; IEEE Transactions on Magnetics, vol. 30, No. 6, Nov. 1994; pp. 3987–3989.

Figure 25(b) re. Kerr Rotation and Magnetic Field; p. 126; and Definitions of Figures 24–30; p. 79.

Fu, Hong et al.; Article Entitled Dielectric tensor characterization and evaluation of several magneto–optical recording media; J. appl. Phys. 78(6), Sep. 15, 1995; pp. 4076, 4077, 4079, 4081, 4083, 4085, 4087 and 4089.

Huber, W. Don; Article Entitled "Maximal Areal Density for PRML Data Channels"; IEEE Transactions on Magnetics, vol. 32, No. 5, Sep. 8, 1996; pp. 3956–3958.

Webb, William, et al; *Modern Quadrature Amplitude Modulation; Principles and Applications for Fixed and Wireless Communications*; Pentech and IEEE Press; 9 Contents pages attached.

Weathers, Anthony D.; Dissertation Entitled "Modulation Techniques for Digital Magnetic Recording" for the University of California, San Diego; 1990; pp. 116–157.

Forney, Jr., G. David, et al.; Article Entitled "Combined Equalization and Coding Using Precoding"; IEEE Communications Magazine; Dec. 1991; pp. 25–34.

Kobayashi, M., et al. Article Entitled "Beyond 1 $\mu m^2$/bit High Density Recording With Improved QAM Technique"; IEEE Transactions on Consumer Electronics, vol. 37, No. 3, Aug. 1991; pp. 283–290.

Wong, Bennett C.; Article Entitled "A 200–MHz All–Digital QAM Modulator and Demodulator in 1.2–$\mu m$ CMOS for Digital Radio Applications"; IEEE Journal of Solid–State Circuits, vol. 26, No. 12, Dec. 1992; pp. 1970–1980.

* cited by examiner

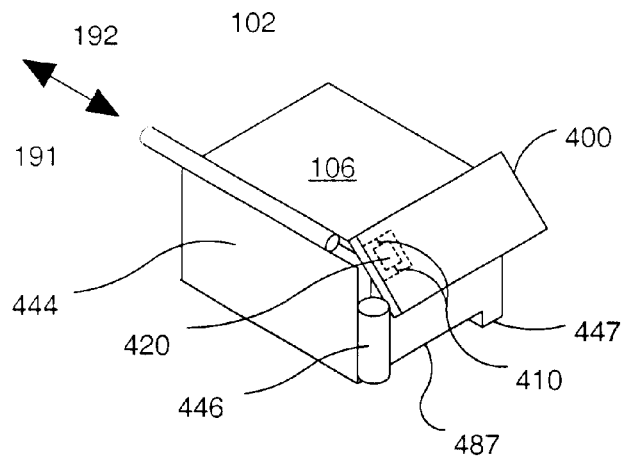
FIG 3a
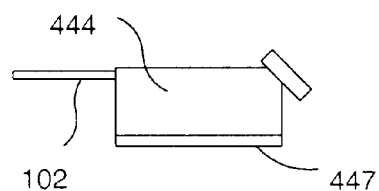
FIG 3d
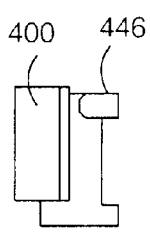
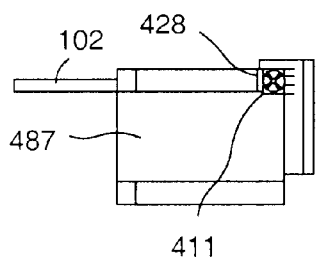
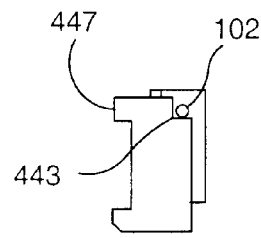
FIG 3e  FIG 3f  FIG 3g

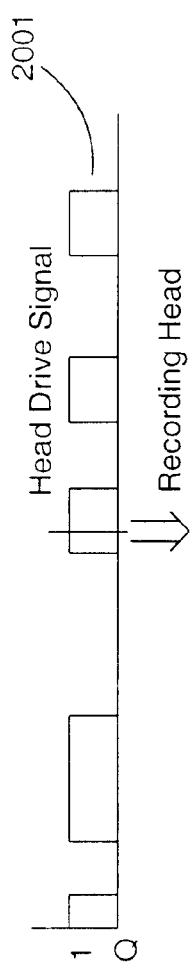
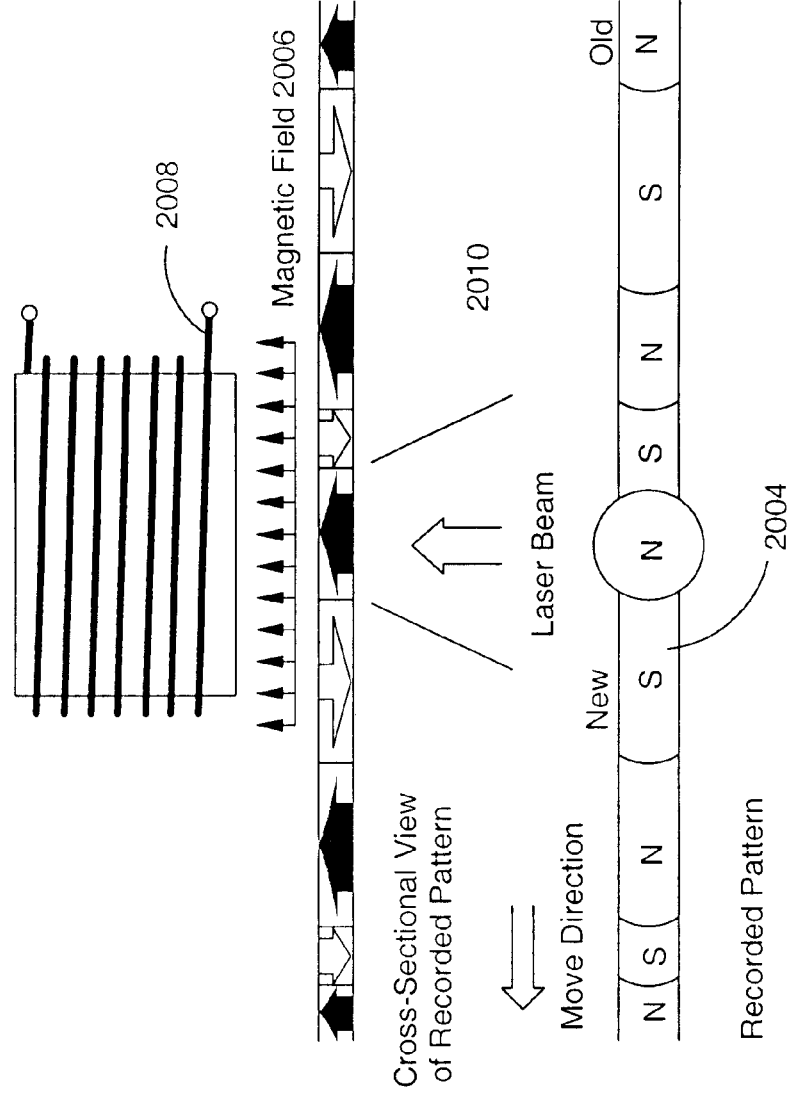

Compressor Input-Output Characteristic.

EFFICIENT LINEARIZATION OF SATURATION CHANNELS

CROSS-REFERENCE TO A RELATED APPLICATION

The present application claims priority to Provisional Application No. 60/160,137 filed Oct. 18, 1999, which is incorporated herein by reference. The application of William D. Huber entitled "A Magneto-Optical Recording System Employing Trucar Recording and Playback Channels", and "Parallel Coded Spread Spectrum Communication for Data Storage", filed herewith, is incorporated herein by reference. This application is a continuation-in-part of application Ser. No. 09/325,012 filed Jun, 2, 1999.

FIELD OF THE INVENTION

Data storage in general, but most advantageously in Magneto-Optical data storage utilizing linear data storage without significant SNR loss.

BACKGROUND

It is well known in communications engineering that a linear channel has considerably more capacity for information transmission than a saturation channel. Data storage channels are invariably saturation channels. Efficient linearization of these channels enables a considerably larger storage capacity and lower cost per MegaByte of stored data. A primary feature of the above-identified application is that MO media has an amorphous film nature and is vertically oriented; the two together are attractive for linearized channel data storage SNR degradation is minimized.

The issue is how to avoid taking an amplitude reduction over what would have occurred with saturation recording. In other words, given the analog signal, which can take on a continuous range of values between its two peak extremes (max and min) one should place that max and min right inside or very close to the max and min extremes utilized in binary saturation recording, and keep the same dynamic range available for the continuous time signal, thereby not suffering peak signal noise.

Previous Solutions

In the past, linearization of saturation magnetic recording channels was done through the use of AC bias techniques. In the prior art, the saturation channel was driven by a transmitter or "write" driver that formed the sum of the analog signal to be recorded and a sinusoidal high frequency bias signal. The frequency of the sinusoidal bias signal was generally greater than three (3) times that of the highest frequency component in the analog data to be recorded. In the receiver or "read" channel the bias frequency is rejected by the low-pass response of the channel and only the analog signal is received. The problem with the prior art of linearization of saturation channels is that there is typically 6 to 7 dB of SNR (signal-to-noise ratio) loss in the analog signal processing from that achievable in two-level saturation signaling. If one attempts to increase the analog signal level to improve the SNR, non-linearity causes excessive generation of inter-modulation products. Moreover, noise is further increased in modem thin metallic film media by the higher flux transition densities caused by the presence of the high-frequency AC bias in the "write" process. This large SNR loss due to these factors is difficult to overcome with the more efficient linear channel signal processing, and has inhibited the application of advanced signal processing techniques to data storage.

SUMMARY OF THE INVENTION

Efficiency of linearization of saturation channels is improved so that there is only 1 to 2 dB of SNR loss in practical implementations of the invention. The process of conventional AC bias linearization is most simply viewed as Duty-Cycle Modulation (DCM) of a high frequency signal in the transmitter. The receiver acts as limiter with hysteresis that is small relative to the amplitude of the duty-cycle modulated high frequency AC bias waveform. This saturation non-linearity is followed by a low-pass filter. Duty cycle modulation occurs along the linear portion of the sinusoid as the analog base-band signal is added to the sinusoidal AC bias. The duty-cycle modulation is linear as long as the additive baseband signal is small relative to the sinusoidal AC bias component as the zero-crossing of the total composite waveform is linearly proportional to the amplitude of the analog base-band signal. This produces a duty-cycle modulated waveform linear over the range of about 25% to 75% of a cycle; consequently, this results in a 50% (6 dB) loss of received signal amplitude over that possible with simple saturation signaling. The novel idea presented here results first from the recognition that AC bias linearization is most simply modeled as a duty-cycle modulation. Subsequently, duty-cycle modulator (DCM) is designed to produce a full range of 0% to 100% duty-cycle modulation.

Since the output and input are nearly equal in the base band level, the present invention utilizes the fact that the conventional AC bias was in fact doing pulsewidth modulation, or duty cycle modulation, and in readback the readout was low pass filtering the duty cycle modulated recorded signal and recovering the base band signal. Preferably, according to this invention, a more linear duty cycle modulator is made by converting the sine wave bias into a triangle wave bias so that the sine wave slopes are linear all the way up to the peaks, they turn the corner and then remain linear back to the subsequent peak. As the base band signal is added precisely having its amplitude equal to the amplitude of the triangle wave bias, then the composite sum just barely touches zero coming from above and just barely touches zero coming from below to give you nearly zero width pulses coming from above and below on the limiter; when you low pass filter out the high frequency content of the duty cycle modulated waveform, the base band signal is recovered at full amplitude as if saturation recording was being utilized.

Secondly, magnetic media is used that does not produce added noise as the flux-transition density is increased. The amorphous medium and vertical magnetic recording associated with magneto-optical recording aids the linear magnetic recording process. A small spot on the vertically oriented medium is heated by a focused optical beam to reduce the magnetic coercivity over the region on which information is to be recorded. This is the erasable MFM (magnetic field modulation) magneto-optical recording process. It is ideally suited to the application of linearization through the use of duty-cycle modulation as described here. Because the medium is amorphous, it does not exhibit a prohibitive increase of noise as the flux transition density is increased as is the case with conventional digital magnetic recording on thin metallic films used in current state-of-the-art in disc drives.

A method of reducing the peak signal-to-noise (SNR) requirement in linearized magnetic recording further comprises the use of a compandor coupled with the duty-cycle modulator (DCM). This removes most of the penalty associated with the high peak-to-average power ratios of the bandwidth efficient modulation schemes. Transition noise in the media still remains the chief limiting factor in performance.

BRIEF DESCRIPTION OF THE FIGURES

FIGS. 3a–3g illustrate details of the head/slider arrangement that focuses laser light o the disc to read and record data.

FIGS. 5a and 5b are schematic diagrams of laser aided magnetic recording.

DETAILED DESCRIPTION OF THE PREFERRED EMBODIMENTS

The present invention provides a signal representative of the data recorded on the data disk that has an improved signal-to-noise ratio (SNR) as compared to conventional MO data readout. In doing so, the present invention enhances the capacity of the recording system by enabling a linear recording system. Except for modifications to the electronics of the read and write channels, an exemplary system in which this invention is utilized is any typical MO recording system. However, a brief description of an MO system useful for implementing this invention is given here.

Figure 1:
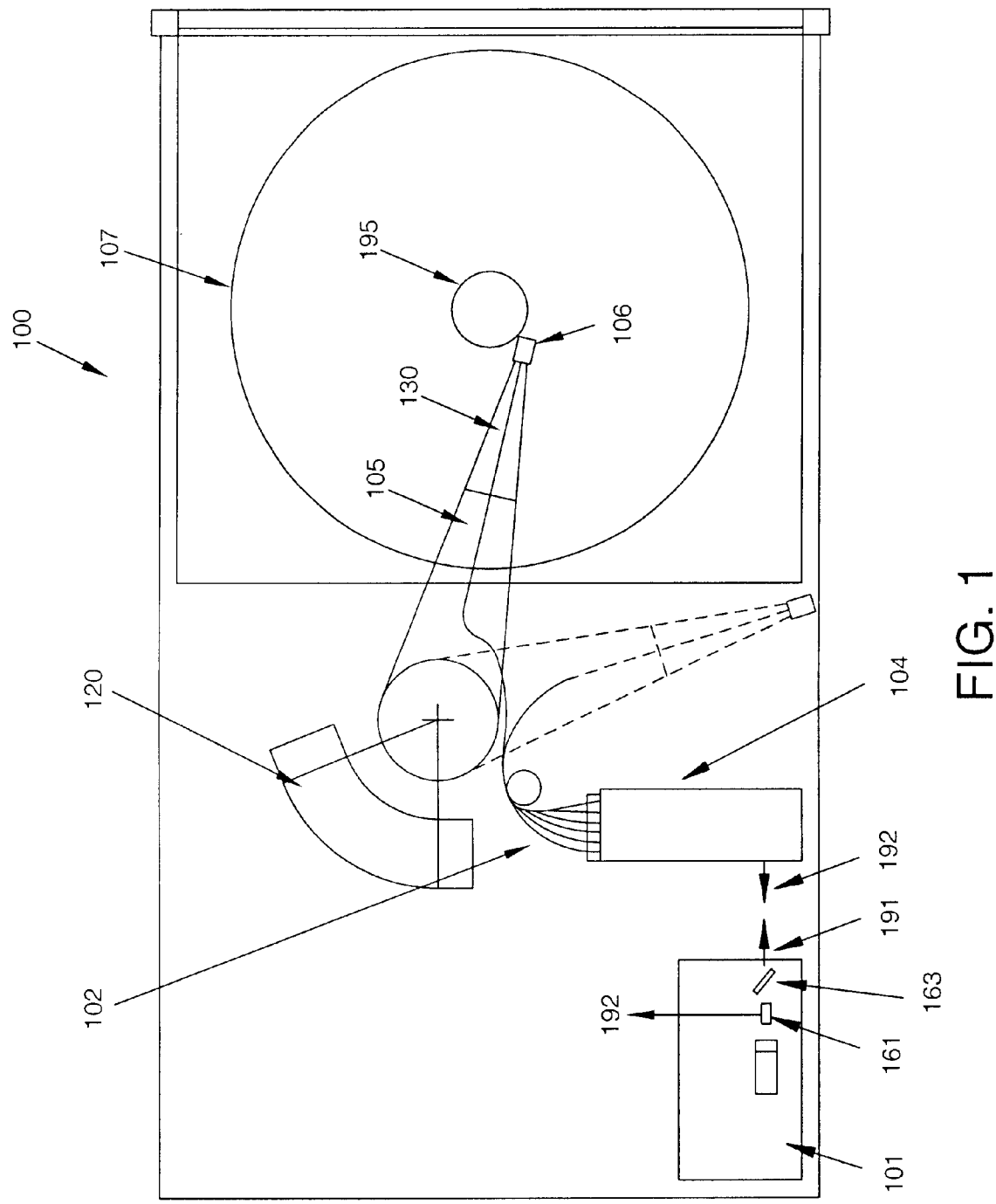
FIG. 1 is a plain view of a magneto-optical system in which the present invention may be useful.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (only one flying head and one MO disk shown). The set of flying heads 106 (hereinafter referred to as flying MO heads) are coupled to a rotary actuator magnet and coil assembly 120 by a respective suspension 130 and actuator arm 105 so as to be positioned over upper and lower surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of optical fibers 102. The laser-optics assembly 101 includes a polarized diode laser source 231 operating an optical power sufficient for writing and reading information using the set of MO disks 107. The laser optics assembly 101 provides an outgoing laser beam 191 (with reference to laser source 231) that passes through a polarizing beam splitter 161 and quarter-wave plate 163 before entering the optical switch 104. In the exemplary embodiment, each of the set of optical fibers 102 are coupled through a respective one of the set of actuator arms 105 and suspensions 130 to a respective one of the set of flying MO heads 106.

Figure 2:
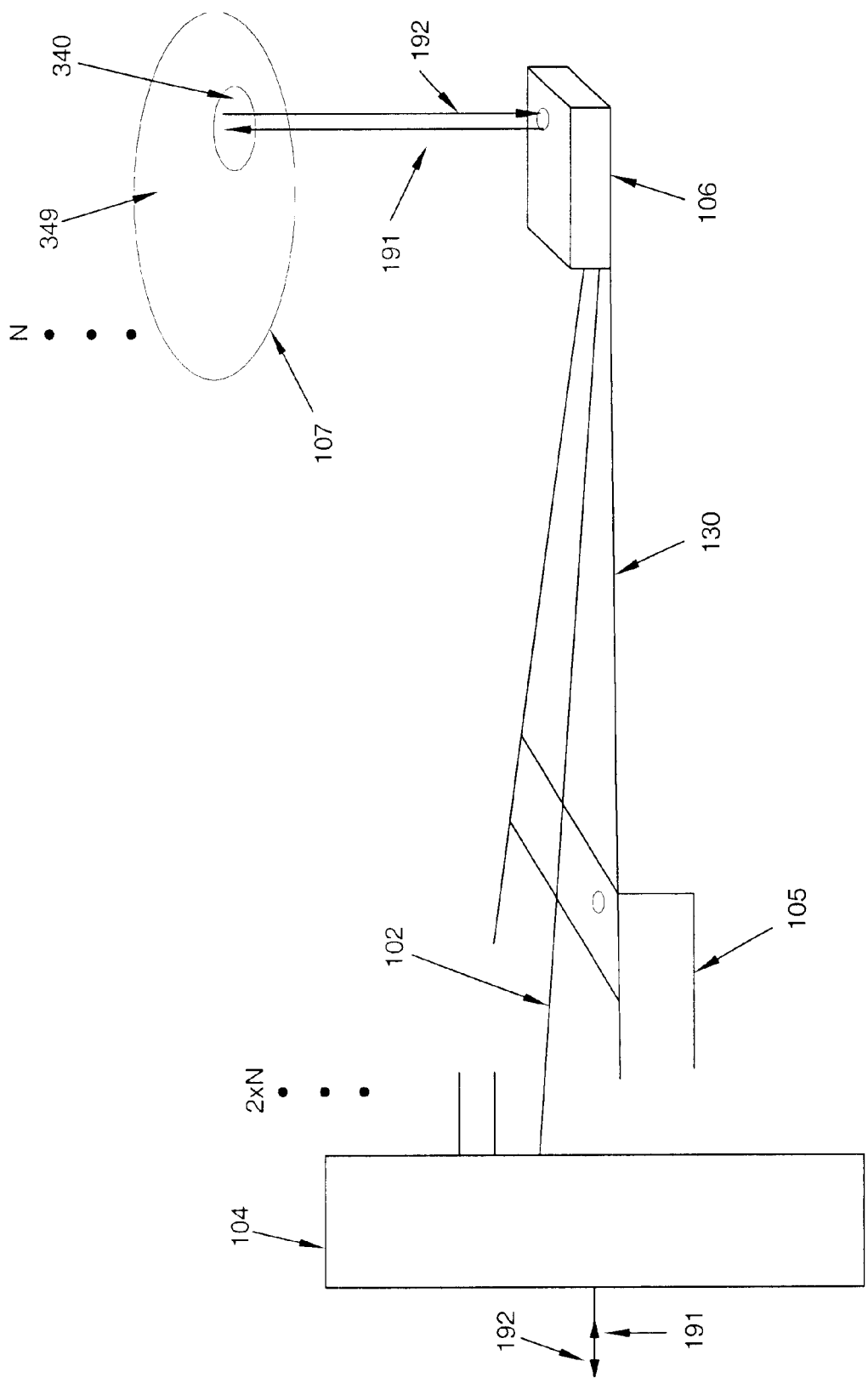
FIG. 2 is an enlarged view of the actuator arm, slider and disk portions of the m-o system of FIG. 1.

FIG. 2 is a diagram showing a representative optical path. In a preferred embodiment, a representative optical path as shown in FIG. 2 includes: the optical switch 104, one of the set of optical fibers 102, and one of the set of flying MO heads 106. The optical switch 104 provides sufficient degrees of selectivity for directing the outgoing laser beam 191 (with reference to laser source 231) to enter a respective proximal end of a respective optical fiber 102. The outgoing laser beam 191 is directed by the optical fiber 102 to exit the optical fiber 102 so as to pass through the flying MO head 106 onto a surface recording/storage layer 349 of a respective MO disk 107. As described below, according to this invention, the disk 107 uses magnetic super-resolution (MSR) technology and MR technology.

During track following of data tracks on the disk 107, the system of this invention utilizes the laser to achieve enhanced track following capability, as well as to selectively heat the media where the data is to be accessed. The outgoing laser beam 191 is reflected from the MO disk 107 as a reflected laser beam 192 and is conveyed back by optical elements on the flying MO head 106, the optical fiber 102, and the optical switch to the laser optics assembly 101 (FIG. 1) via the optical switch 104. An amplitude of the reflected laser beam 192 passes through the quarter-wave plate 163 and the polarizing beam splitter 161 and is used for deriving phase change track following signals for use by conventional phase change track-following circuitry (not shown).

Figure 3B:
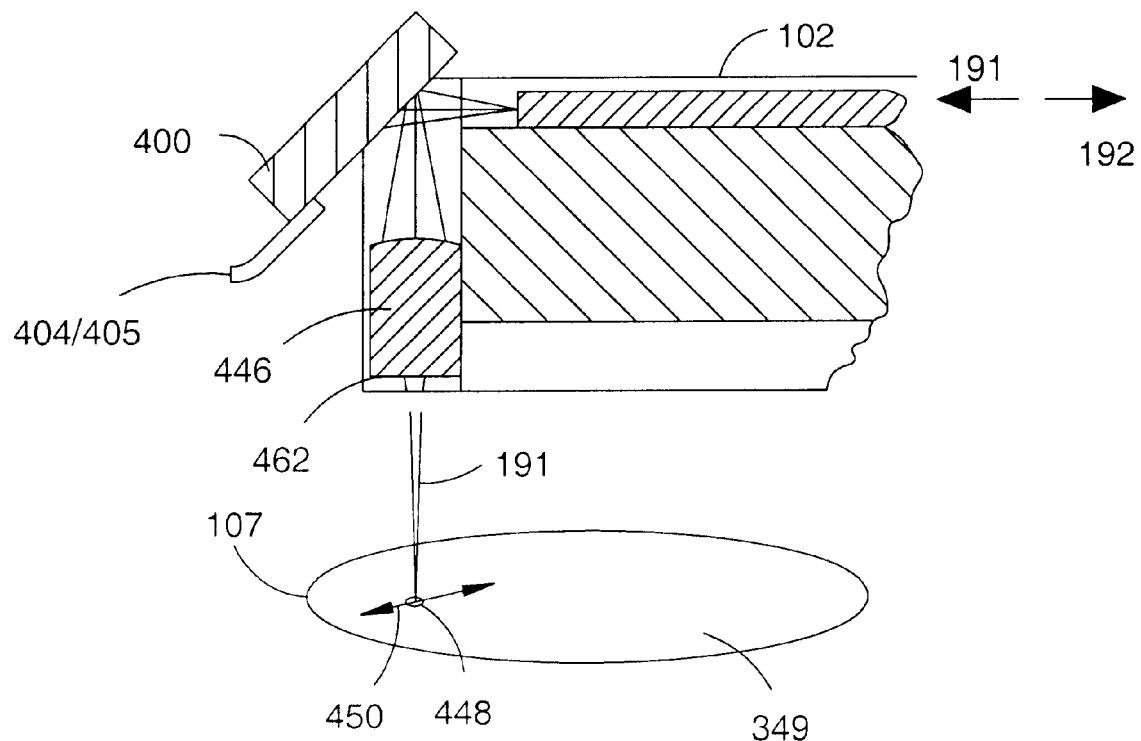
Figure 3C:
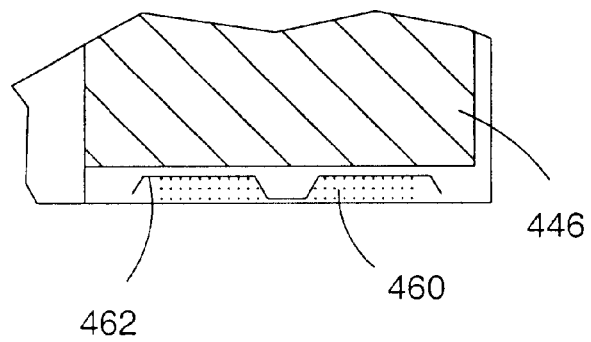

FIGS. 3a–f are diagrams showing the flying magneto-optical head of the magneto-optical data storage system in a perspective, a side cross-sectional, an expanded cross-section, a side, a front, a bottom, and a rear view, respectively. In FIG. 3a, the flying MO head 106 is shown for use above a surface recording layer 349 of one of the set of MO disks 107. The flying MO head 106 includes: a slider body 444, an air bearing surface 447, a reflective substrate 400, objective optics 446, a conductor 460, and a flux guide 462. In one embodiment, the flux guide 462 includes a permalloy flux guide. The slider body 444 is dimensioned to accommodate the working distances between the objective optics 446, the optical fiber 102, and the substrate 400. The reflective substrate 400 may include a reflective surface which is aligned so as to direct the outgoing laser beam 191 to the surface recording/storage layer 349. Although the slider body 444 may include industry standard "mini", "micro", "nano", or "pico" sliders, alternatively dimensioned slider bodies 444 may also be used. Accordingly, in the preferred embodiment, the slider body 444 comprises a mini slider height (889 μm) and a planar footprint area corresponding to that of a nano slider (1600×2032 μm).

The optical fiber 102 is coupled to the slider body 444 along an axial cutout 443, and the objective optics 446 is coupled to the slider body 444 along a vertical corner cutout 411. Although in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis of the flying MO had 106, or, alternatively, along the central axis itself. Those skilled in the art will recognize that positioning the optical fiber 102 and the objective optics 446 at other than along a central axis may function to affect a center of mass of the flying MO head 106 and, thus, its flying dynamics. Accordingly, the point of attachment of the flying MO head 106 to the suspension may require adjustment to compensate for off-center changes in the center of mass of the flying MO head 106. Preferably, the cutouts 443 and 411 may be designed as channels, v-grooves, or any other suitable means for coupling and aligning the optical fiber 102 and objective optics 446 to the flying MO head 106. In the preferred embodiment, the outgoing laser beam 191 traverses an optical path to the recording/storage layer 349 of the MO disk 107 that includes: the optical fiber 102, the reflective element 400, and the objective optics 446. In the preferred embodiment, the optical fiber 102 and the objective optics 446 are positioned within their respective cutouts to achieve focus of the outgoing laser beam 191 within the spot of interest 340 as a focused optical spot 448. The optical fiber 102 and the objective optics 446 may be subsequently secured in place by using ultraviolet curing epoxy or similar adhesive.

As compared to free space delivery of laser light, the optical fiber 102 provides an accurate means of alignment and delivery of the outgoing laser beam 191 to the reflective substrate 400. The optical fiber 102 also provides a low mass and low profile optical path. The low mass of the optical fiber 102 provides a method of delivering light to the optics of the flying MO head 106 without interfering substantially with the operating characteristics of the actuator arm 105 and suspension 130. The low profile of the optical fiber 102 provides the ability to reduce the distance between a set of MO disks 107 without interfering with delivery of laser light to and from the MO disks 107 and/or operation of the flying MO head 106. The optical fiber 102 also appears as an aperture of a confocal optical system for the reflected laser beam 192 and has a large depth resolution along its optical axis and an improved transverse resolution.

In an exemplary embodiment, the reflective element 400 may comprise a steerable micro-machined mirror assembly. In a preferred embodiment, the steerable micro-machined mirror assembly 400 includes a small (in one embodiment, less than 300 μm square) reflective central mirror portion 420 (illustrated in FIG. 3a by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 and the reflected laser beam 192 is changed before transmission to the objective optics 446. The reflective central mirror portion 420 is rotated by applying a differential voltage to a set of drive electrodes 404/405 (FIG. 3b). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately ±2 degrees of the reflective central mirror portion 420 is used for movement of the focused optical spot 448 in an approximately radial direction 450 of the MO disk 107 (equivalent to approximately ±4 tracks) for storage of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the steerable micro-machine mirror assemblies 400 of the present invention may be used to operate independently and thus permit track following and seeks so as to read and/or write information using more than one MO disk surface at any given time. Independent track following and seeks using a set of concurrently operating steerable micromachined assemblies 400 would preferably require a set of separate respective read channel and fine track electronics and mirror driving electronics. In the aforementioned embodiment, because delivery of the outgoing laser beam 191 would preferably require separate diode laser sources 131, an optical switch 104 for switching between each of the separate optical paths would not necessarily be required.

Figure 4:
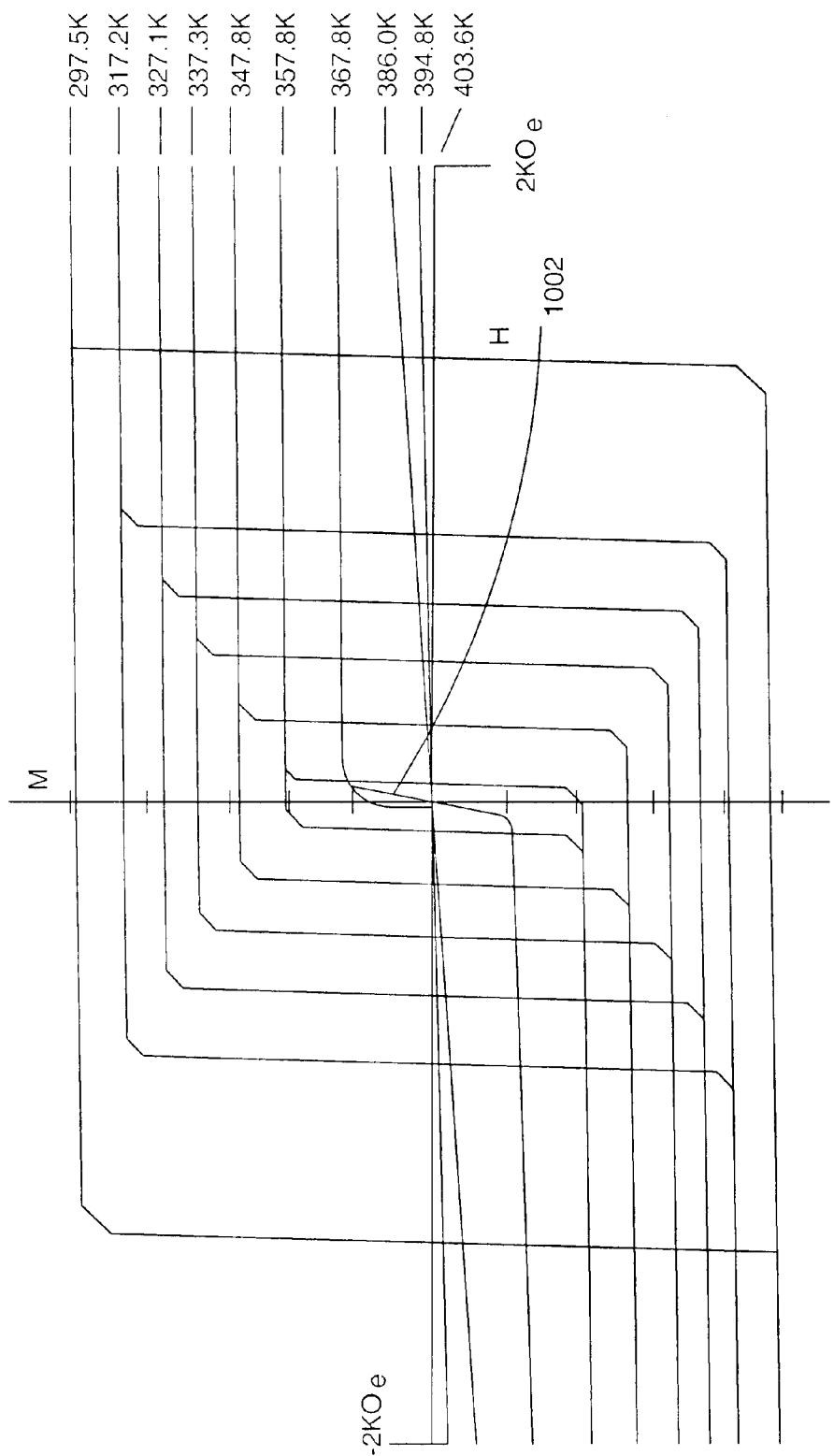
FIGS. 4 is the hysteresis loop of typical MO recording material as a function of temperature.

FIG. 4 illustrates the reduction of the magnetic hysteresis loop in such a material as temperature is increased by the incident optical beam on a small spot. At 367.8 K the width of the hysteresis loop is almost zero. As the material cools after the medium moves away from the heat of the focused laser beam, its vertical magnetic orientation takes on the direction applied by the trailing magnetic field from the modulation coil. The hysteresis increases to that corresponding to the lower temperature. This freezes the magnetic orientation in this small crescent-shaped region until it is heated for the next process.

A diagram of a typical recording arrangement for laser-aided magnetic recording is diagrammed in FIGS. 5a and 5b. FIG. 5a is a schematic of an MO system; FIG. 5B illustrates the data pattern recorded. In this simple schematic which is intended to show the recorded data patterns created by the head drive signal 2001 to the coil 2008. The polarity of the recorded bits as shown at line 2002A; the polarity pattern appears at 2002B. The "old" vertically oriented magnetic data 2002B are "written" over by the "new" data 2004B through the magnetic field 2006 generated by the current in the coil 2008 (although modulation of the light source, and other alternatives, are also available). The laser beam 2010 defines the size of the recorded crescents. Magnetic recording is inherently a saturation process; however, the channel can be linearized with no loss in bandwidth and very little loss in SNR as will be shown.

As described above, high efficiency magnetic coupling is desirable for "writing" the much higher frequency components required to linearize the channel so that the overall bandwidth is limited by the "read" process and is not diminished from that achievable in saturation recording. In vertical magnetic recording a soft magnetic underlayer may be used to provide a low reluctance return path for the vertical field patterns being transferred. Such a technique is also applicable for laser aided vertical magnetic recording.

Figure 6:
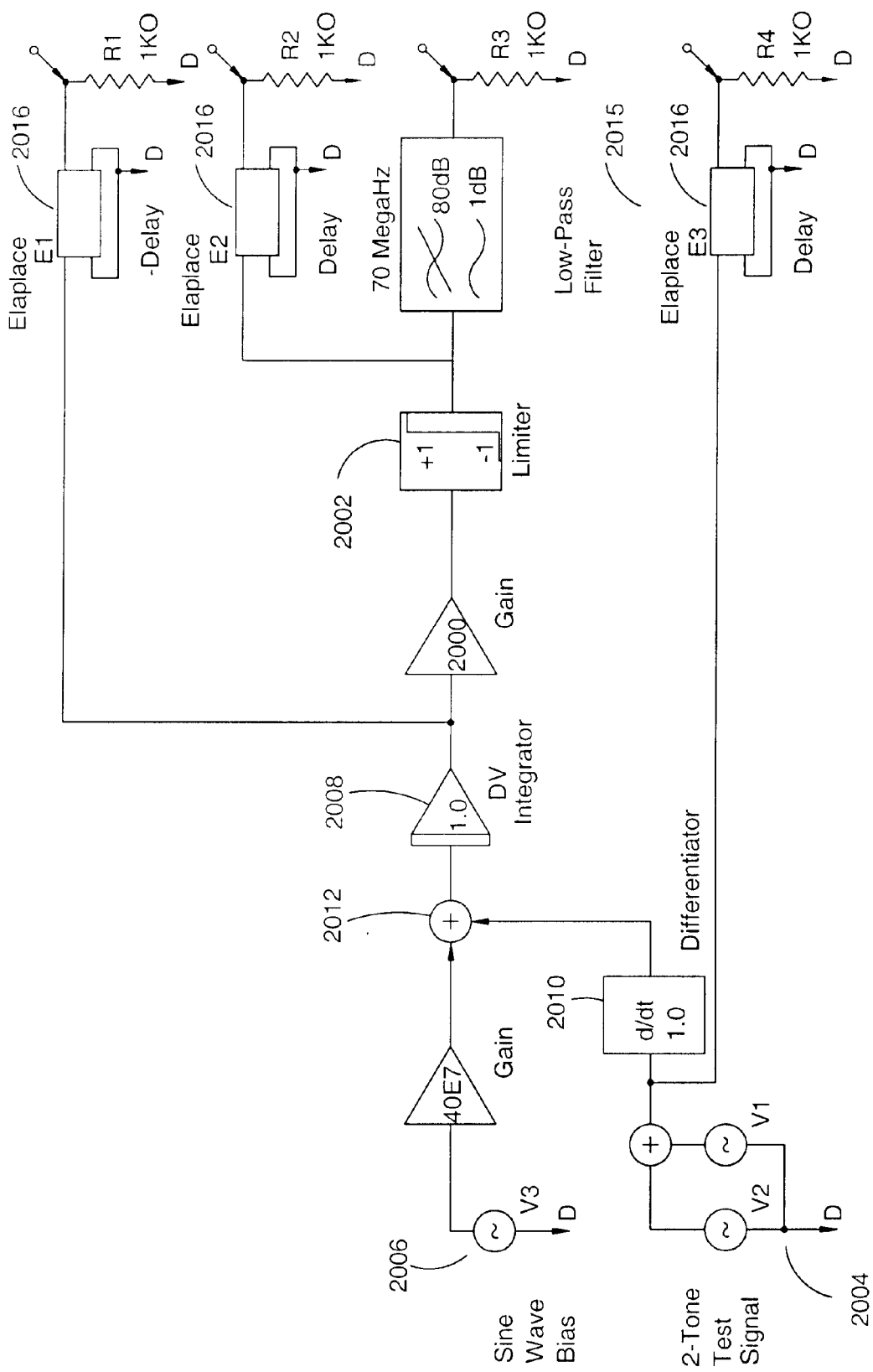
FIG. 6 is a simulation model of conventional AC bias recording.

FIG. 6 is a very simplified model of conventional AC bias recording. AC bias recording consists of creating a write current waveform including a high frequency sinusoid algebraically summed with a complex analog base band signal and then that sum applied as the write current waveform or converted to a magnetic field at the head to write to the medium.

This non-linear process is modeled as a limiter 2002 shown in FIG. 6 with a small hysteresis. Here the AC bias process consists of summing a high-frequency sinusoid with a base-band test signal consisting of two relatively low frequency sinusoidal tones 2004 that are close together in frequency. The magnetic field modulation coil is primarily inductive; consequently, an applied voltage, $v_L$, 2006 is integrated 2008 to an output current, i $$i = \frac{1}{L} \int v_L(t) dt \qquad (1)$$

The base-band 2-tone signal is equalized by a differentiator 2010. The output of the differentiator is summed 2012 with the sinusoidal bias signal. The resulting voltage is integrated 2008 by the coil to produce the model write current. The applied magnetic field is proportional to the current in the coil. The limiter 2002 models the magnetic hysteresis at the "freeze" point, i.e., as the linear data is recorded on disc. Upon play-back the two-level pattern on the medium is sensed through a pick-up and pre-amplifier modeled here as simply a low-pass filter 2015. The bias frequency is above the pass-band of the low-pass filter. The indicated delays 2016 are placed on testpoints to match the delay through the low-pass filter.

FIG. 4 illustrates the sinusoid summed with the high frequency AC bias sinusoid which is then passed through the recording process. The recording process is modeled simply as a limiter and so the larger amplitude base band signal, i.e., the one at low frequency goes up to the peak of the limiter. What is recovered is reduced because the duty cycle cannot be pushed to zero or 100% at the extremes because linearity must be maintained in the modulation process. This results in a loss of almost half the amplitude in the recovered data.

This limiter 2002 output which is still only two level, (plus one, minus one), has its duty cycle modulated so that the area under the curve either can go to nearly plus one or nearly minus one. To achieve exactly plus and minus one, these pulses must be shrunk down to zero in the modulation process which would mean raising the amplitude of the bias relative to the amplitude of the baseband so that these points would cross zero, which is the limiter threshold to create a zero width pulse. But in so doing, the curvature of the sine wave causes non-linear transformation of analog base band amplitude into a duty cycle.

Figure 7:
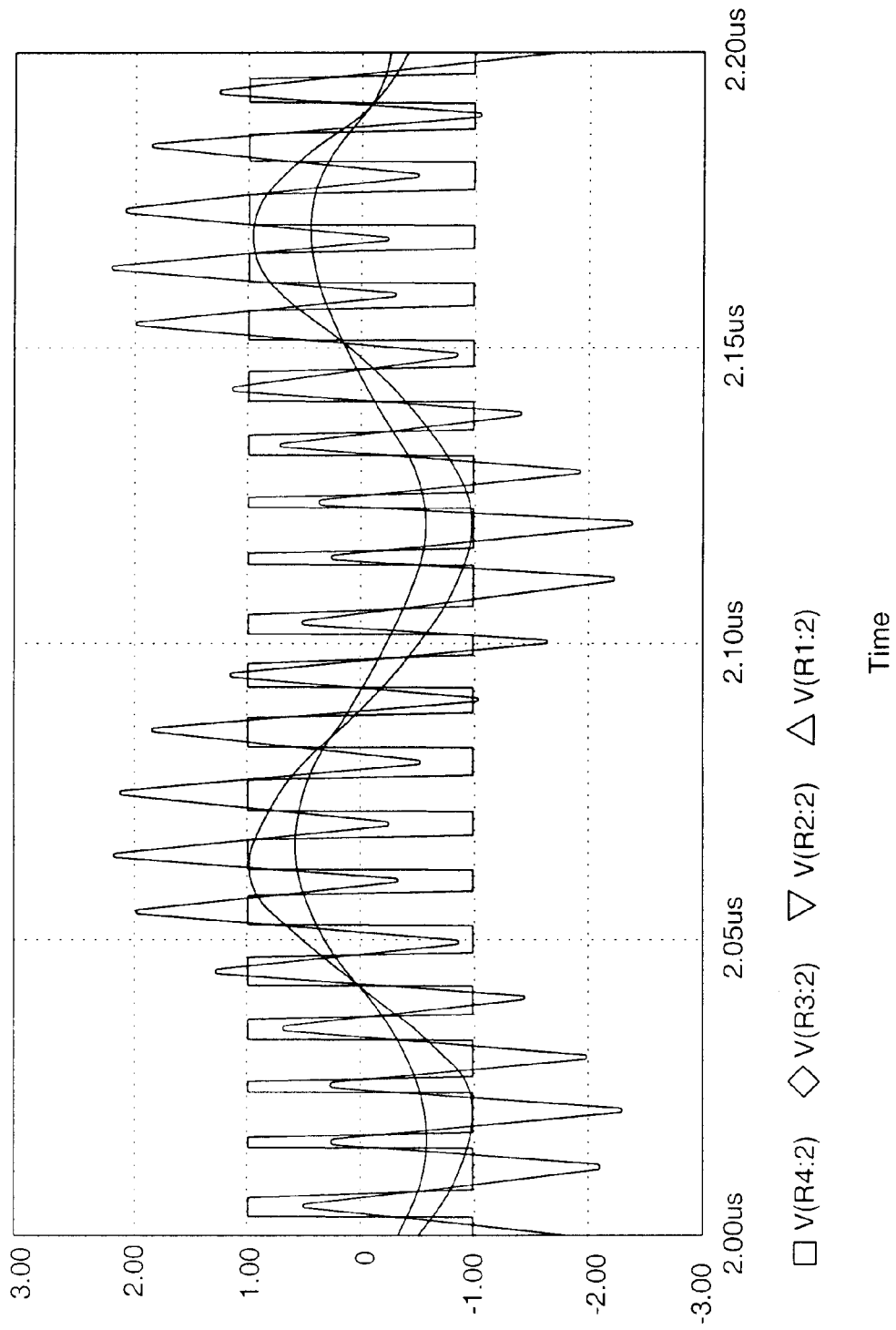
FIG. 7 illustrates waveforms in low-distortion AC bias linear recording.

FIG. 7 shows how the duty-cycle of the of the limiter output that is analogous to the pattern "written" on the medium is modulated according to the analog base-band 2-tone test signal (shown at the left of FIG. 6). The natural low-pass response of the play-back mechanism filters out the fundamental and harmonics of the duty-cycle modulated square-wave leaving only the low-frequency content of the original base-band signal.

Figure 8:
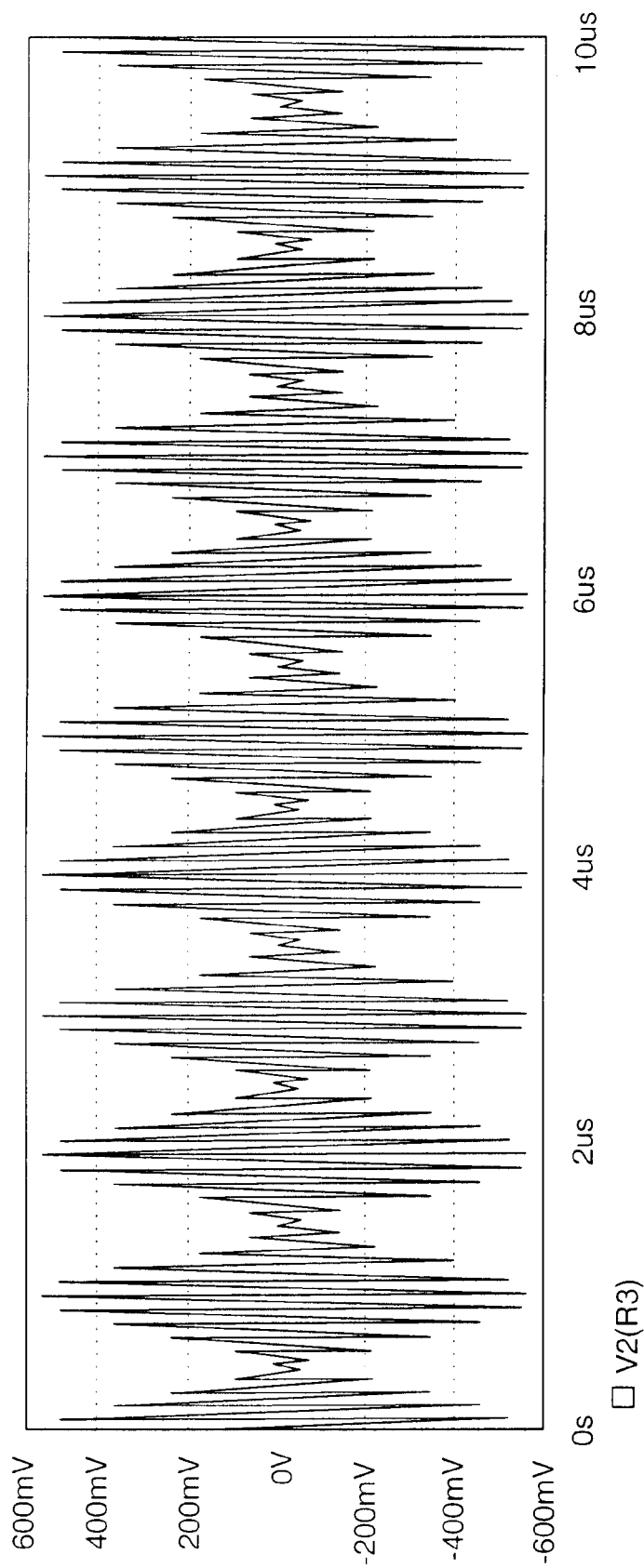
FIG. 8 is a diagram of a recovered analog base band 2-tone test signal.
Figure 9:
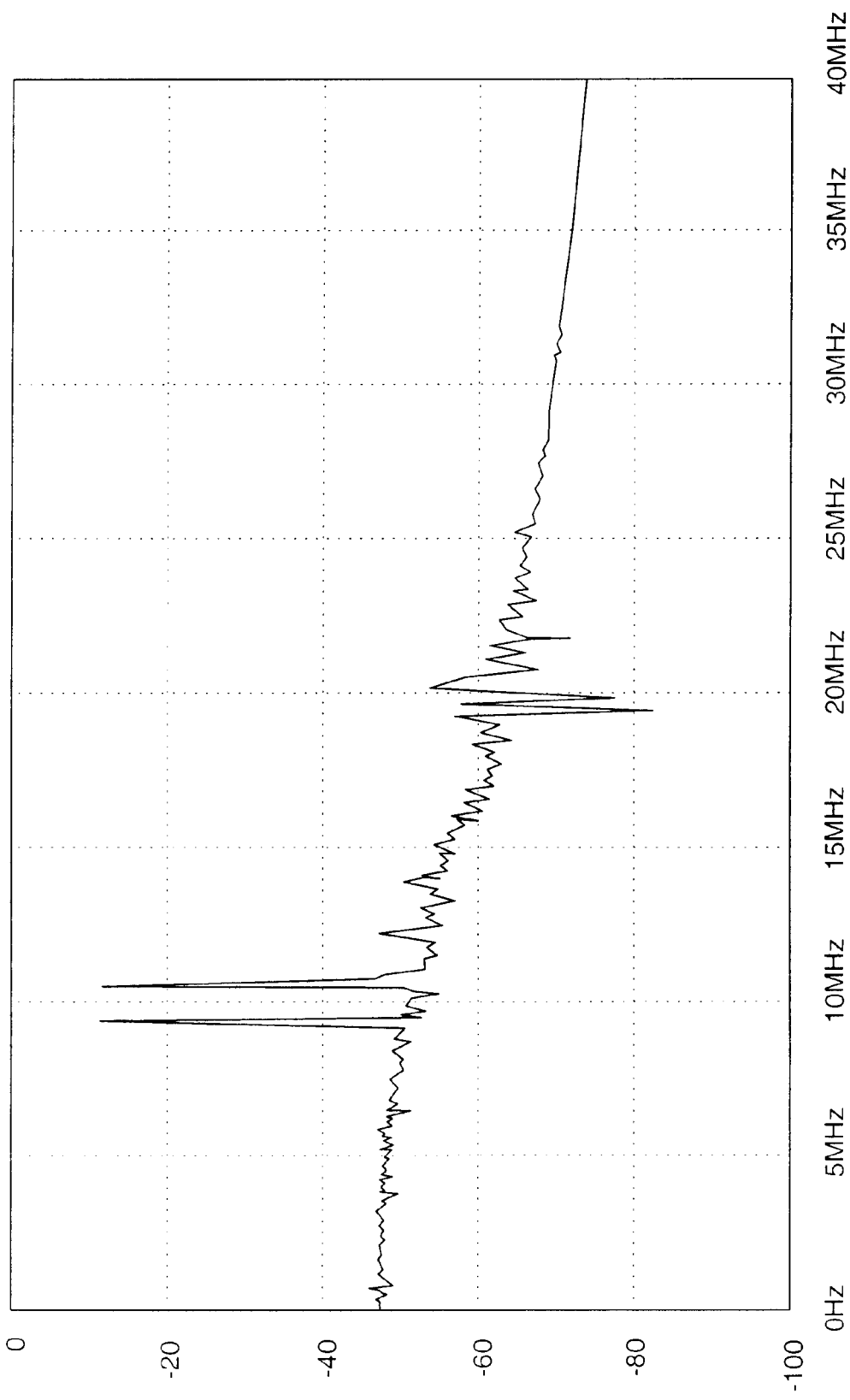
FIG. 9 diagrams a spectrum of recovered analog base-band 2-tone test signal.

FIGS. 8 and 9 show time domain and spectrum of two sine tones added to create a complex base-band; the objective of the present invention is to record such waveforms at maximum amplitude without producing spurious extra frequency components in the output spectrum.

FIG. 8 shows the recovered output signal from the low-pass playback process exemplified in FIG. 6, wherein low-pass filtering of the recorded signal recovers the data signal.

FIG. 9 shows the spectrum of the playback signal. Only the two original sinusoids should be present. The generation of additional frequency components indicates the presence of spurious responses due to non-linearities in converting the base-band analog signal into a duty-cycle modulated two-level signal to be recorded. The record or "write" process is non-linear and can be made wider bandwidth than the playback or "read" process that is purely linear and band-limited. This enables bandwidth efficient AC bias recording. However, conventional AC bias channel linearization is not SNR efficient. Specifically, there occurs 6 to 7 dB amplitude loss relative to possible saturation amplitude.

In summary, FIGS. 6, 7, 8, and 9 represent the conventional analog AC bias scheme of the past, and this simply shows that to get a reasonably clean signal as shown in FIG. 9, a 6 db loss in recovered signal amplitude occurs.

In order for the recovered analog base-band signal to reach the full amplitude of the saturated playback waveform the duty-cycle must be linearly modulated from a full 0% to 100%.

Figure 10:
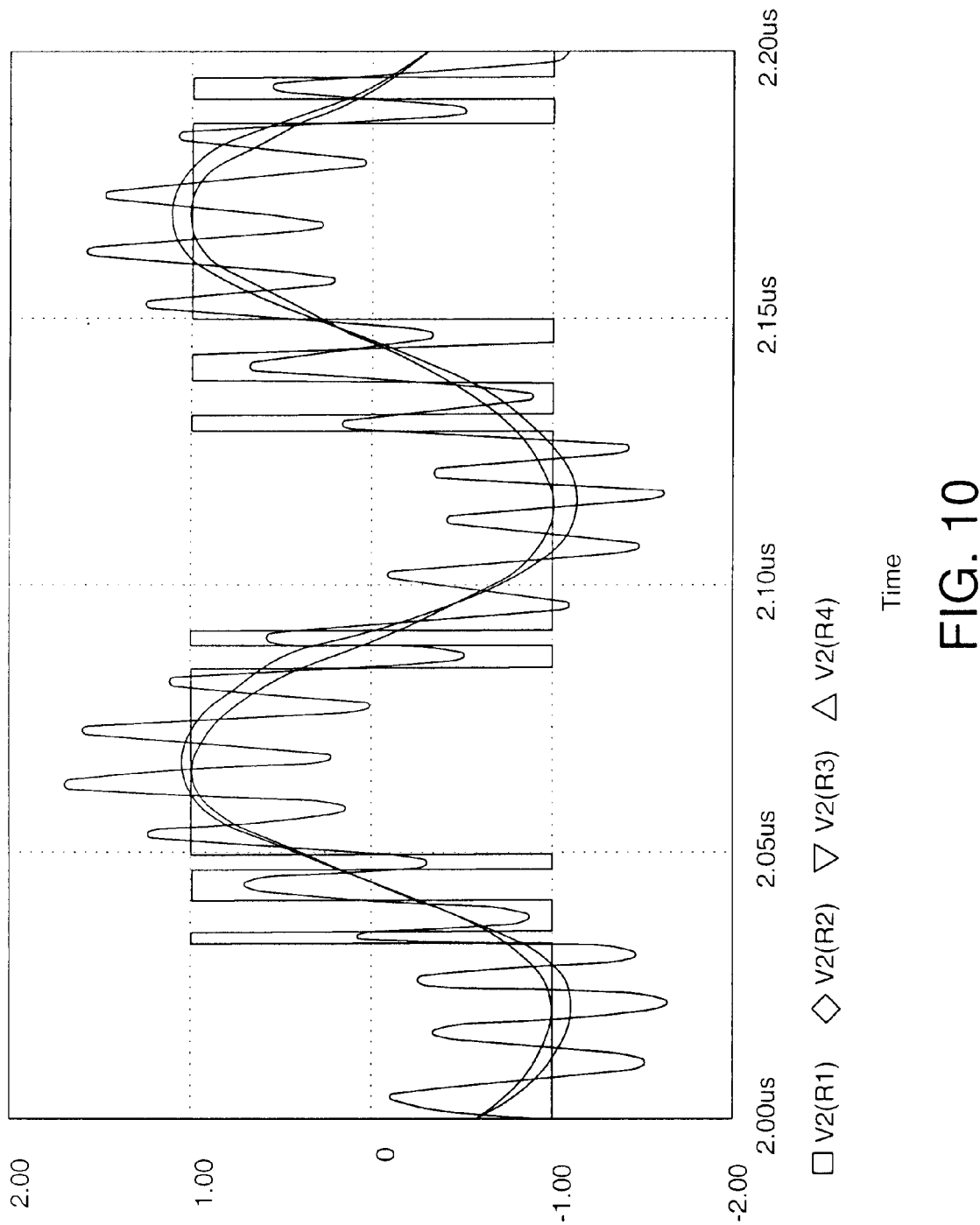
FIG. 10 is a diagram of analog base-band signal as it is increased relative to AC bias sinusoid.
Figure 11:
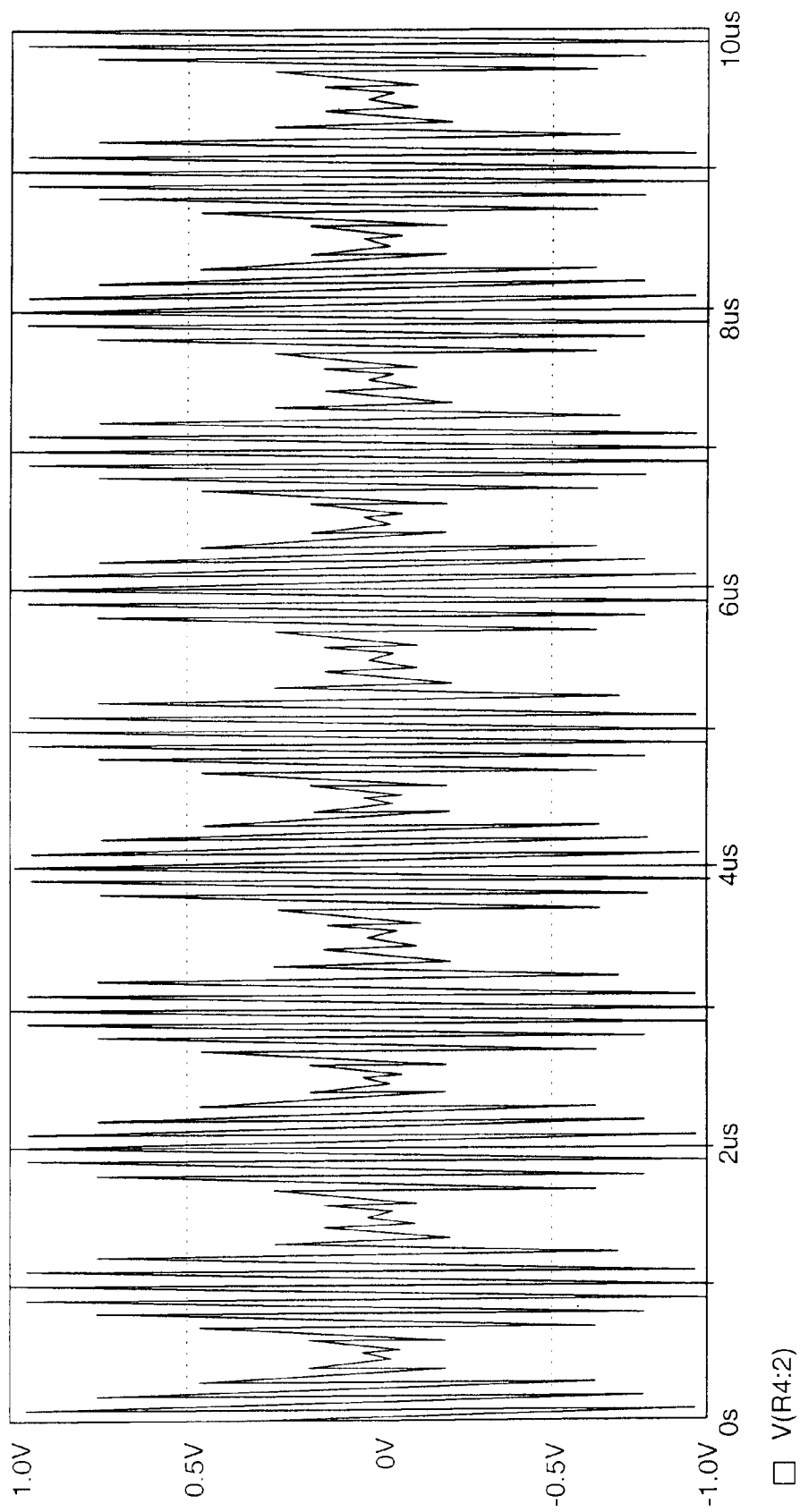
FIG. 11 is a diagram of the play back signal as recovered from MO media.
Figure 12:
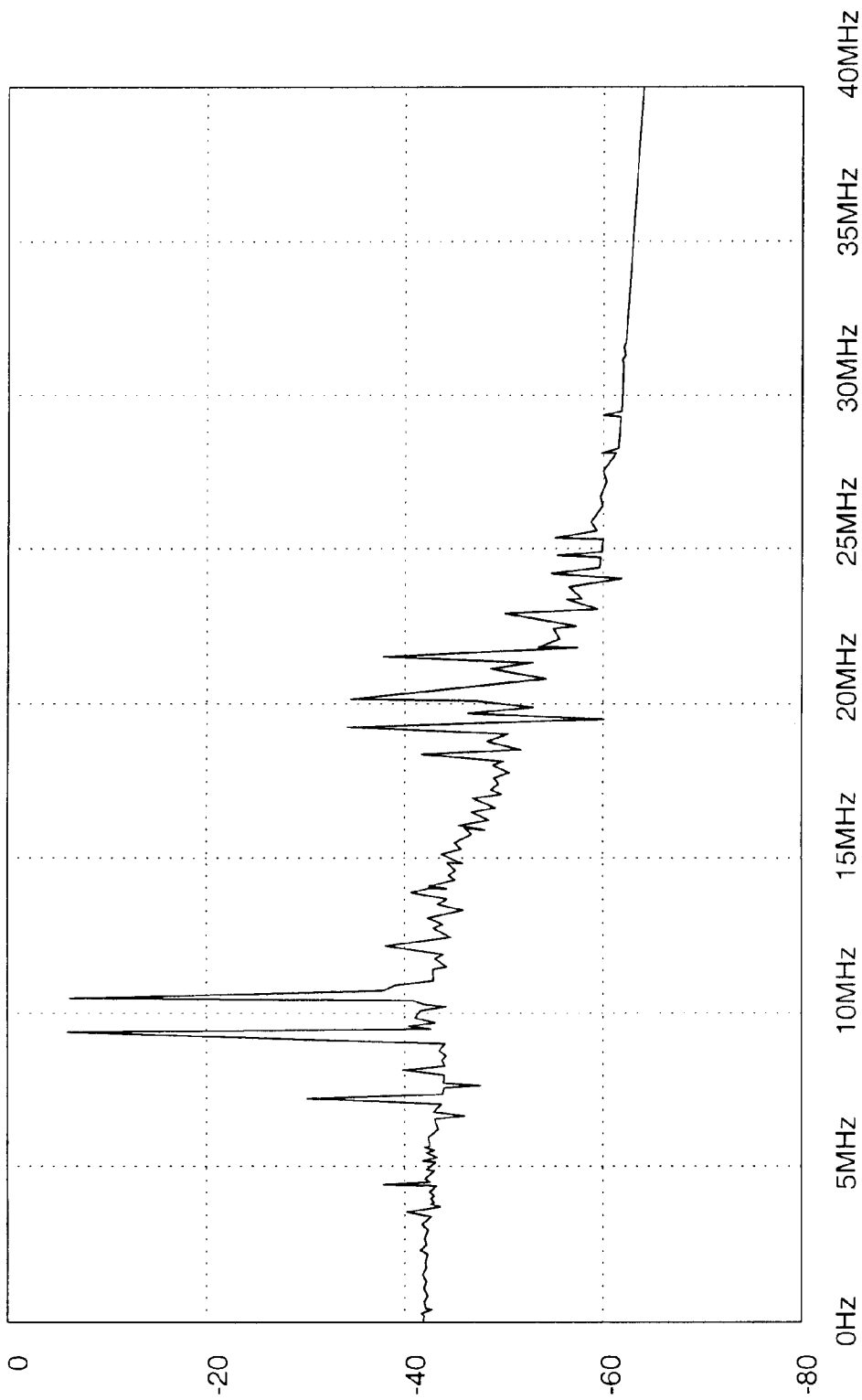
FIG. 12 illustrates the recovered spectrum of a distorted play back signal.

This is clearly not possible with the conventional AC bias architecture and method. As the base band signal amplitude is increased relative to the amplitude of the AC bias the proportionality of duty-cycle vs. baseband signal amplitude is lost. The sequence of FIGS. 10, 11, and 12 illustrate this problem. The distortion created is shown in FIG. 12 as the growth of third order inter-modulation products, $IM_3$.

FIGS. 10 and 11 are still the conventional system, illustrating pushing the amplitude up to indeed get a bigger signal, however, the nonlinear areas that show up as side bands are unacceptable when dealing with a QAM channel or some channel that requires linearity. This will not function because correlated noise will appear.

Figure 13:
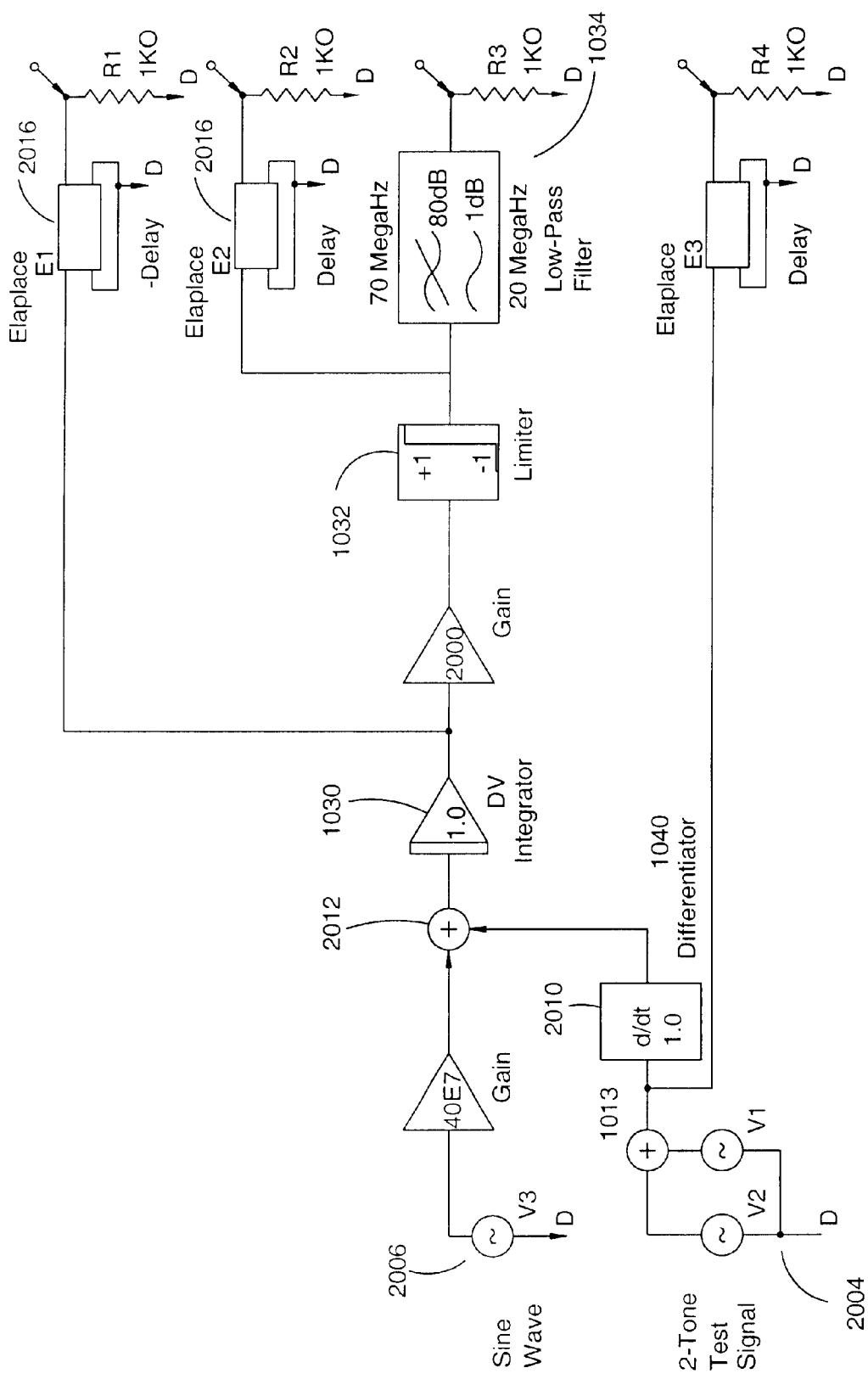
FIG. 13 is a schematic of a recording system model simulation providing 0–100% Duty-Cycle Modulation (DCM).
Figure 14:
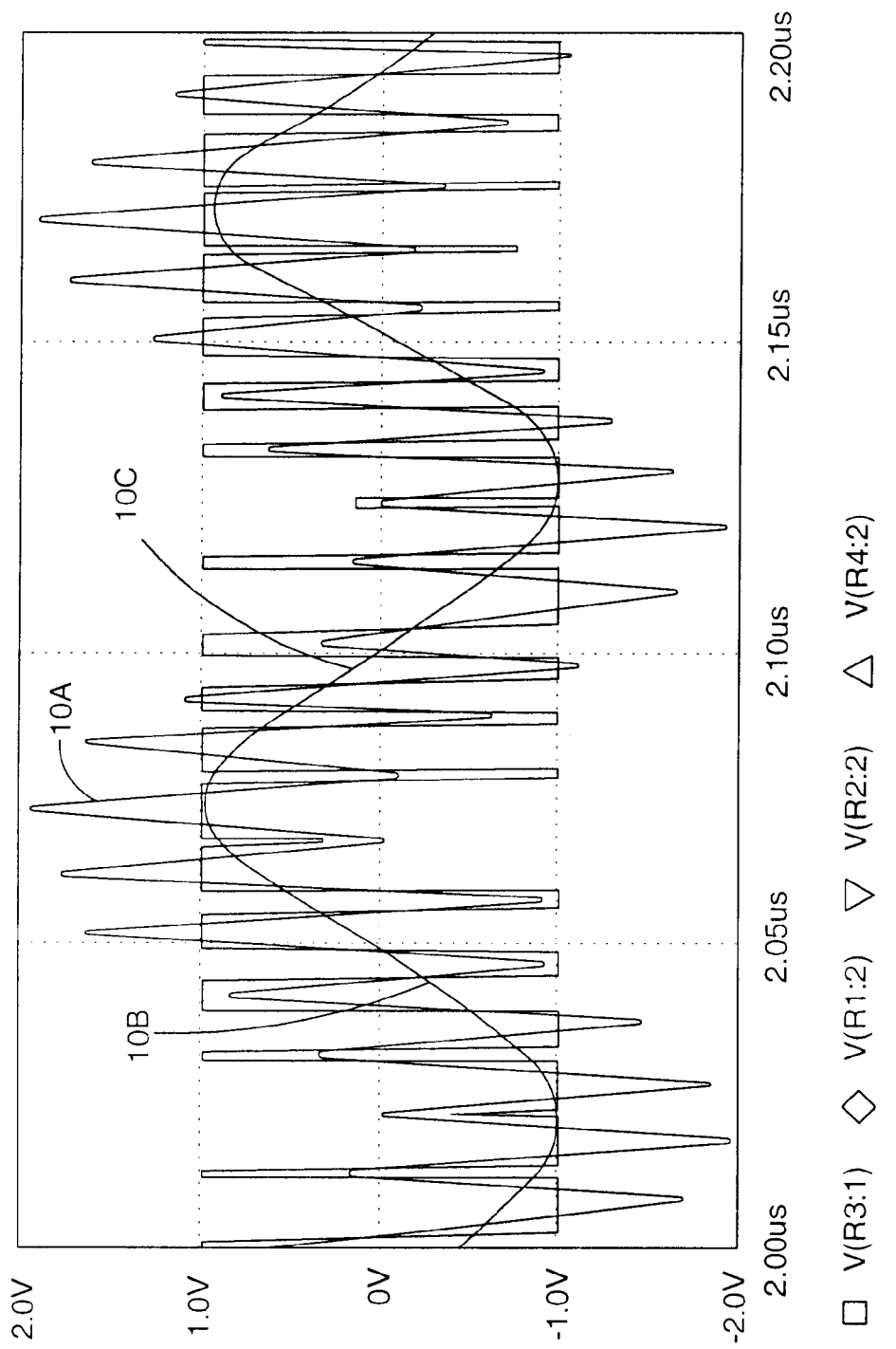
FIG. 14 illustrates waveforms having 0–100% DCM waveforms with zero amplitude loss.
Figure 15:
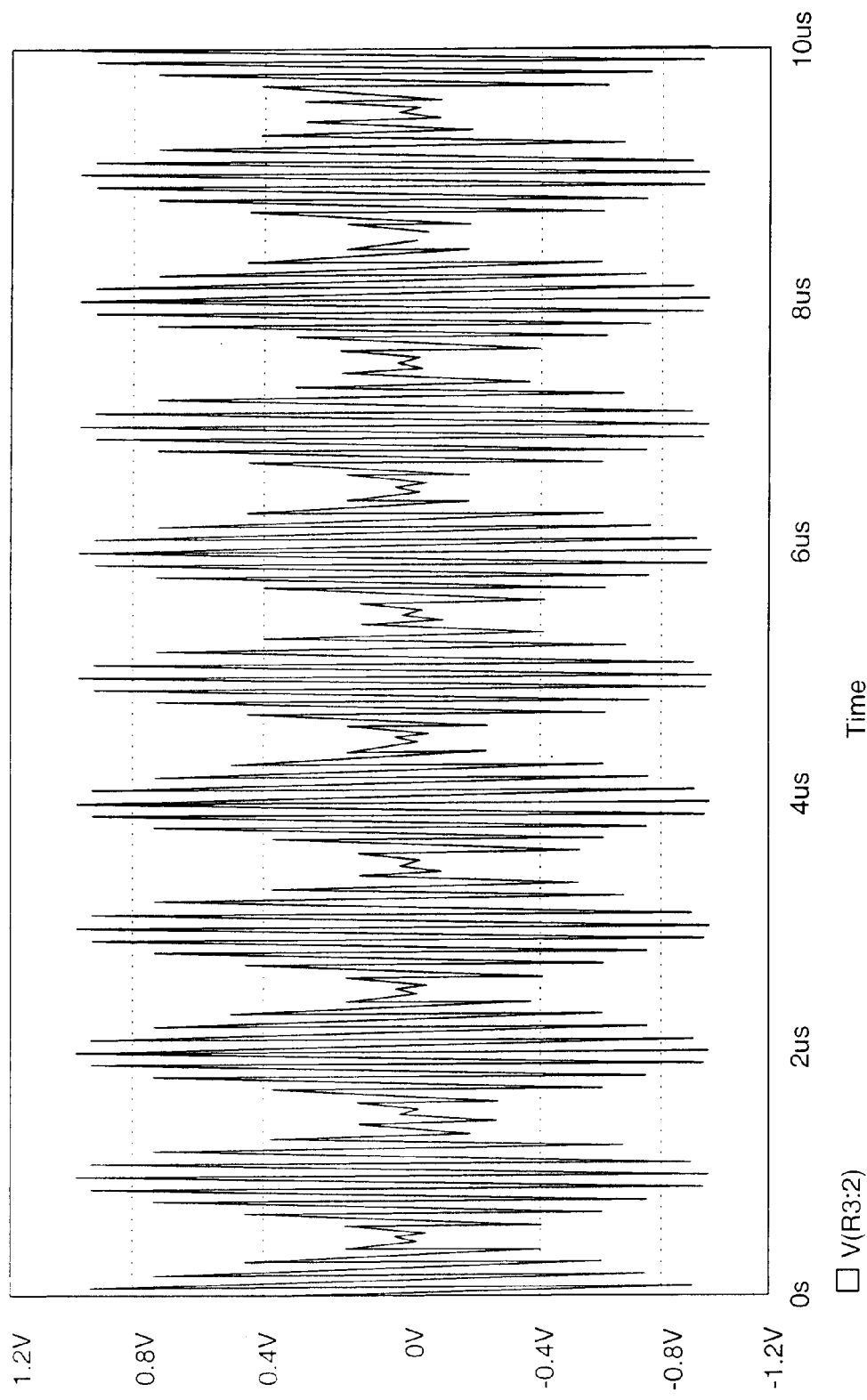
FIG. 15 illustrates a 0 to 100% DCM two-tone test signal output as generated by the circuitry of FIG. 13.
Figure 16:
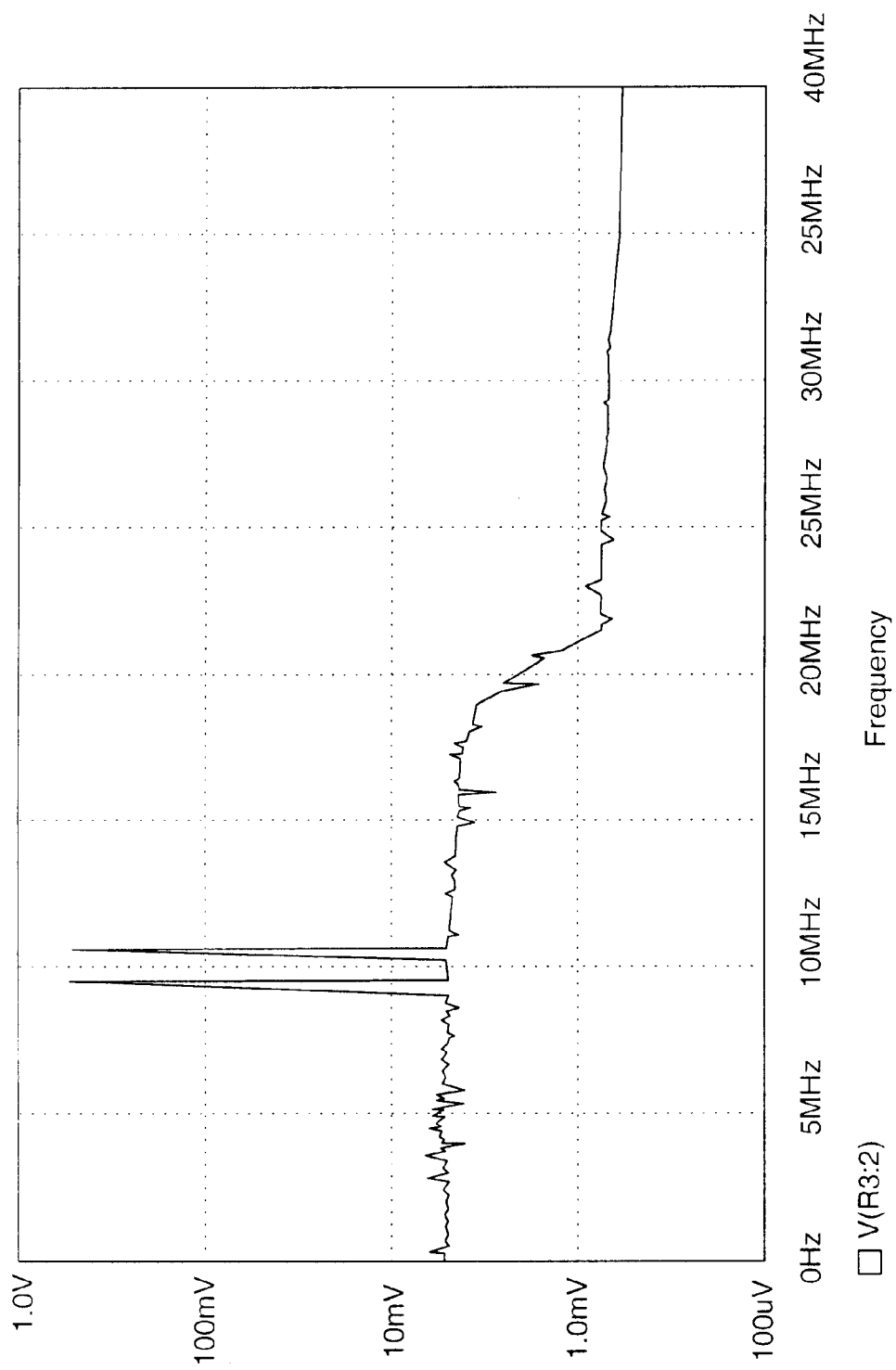
FIG. 16 is a waveform diagram of the spectrum of a two-tone test signal output for 0 to 100% DCM.

FIGS. 13, 14 and the waveforms of 15 and 16 illustrate the new approach of the present invention.

To avoid the undesirable 6 to 7 dB loss in signal amplitude and SNR (if noise is not increased by the high frequency content of the written waveform) one must preserve full linearity in the proportionality of the baseband signal amplitude with the duty cycle of the two level waveform. One way to do this is to create a triangle wave AC bias component to which is added an analog baseband signal whose peak amplitude equals that of the triangular bias. FIG. 13 shows the simulation diagram for such a system where the triangular "write" current bias waveform is created by integrating a 50% duty-cycle squarewave signal at the bias frequency. As before in FIG. 6, the non-linear recording process in modeled by the limiter with small hysteresis. The linear playback process is modeled simply by a low-pass filter. FIG. 14 shows the waveforms generated in this process. The key thing to notice is that the duly cycle of the limiter output reaches 0% to 100% in a manner linearly proportional to the amplitude of the base-band signal.

The simulation circuitry of FIG. 13 begins with wave generator 2006 that could be created by logic circuits as is well known in the art. Summing block 2012 sums in the two-tone sine waves which are differentiated 1040 so that the differentiation mathematically cancels the integration, and the output 10A provides an integrated square wave which is a triangle wave as shown at 10A in FIG. 14.

The point 10B corresponds to the input base band signal which is actually two tones. The combination of a gain of 2,000 preceding a limiter who has a gain of 1 represents a high gain limiter. That output is low pass filtered; the output 10C is simply the other one of these nearly identical sine waves in FIG. 14.

The point is that 10B and 10C have no amplitude loss and are limited only by the amplitude of this limiter 1032 itself, which was plus/minus 1.

The electronic limiter 1404 creates the duty cycle waveform, which is a two-level waveform which drives a write driver 1406 very similar to conventional write drivers now in using saturation recording except that now we have to have higher frequency response or faster rise times so it requires that the write process be a much wider bandwidth and have faster rise time capabilities than the read process.

Figure 17:
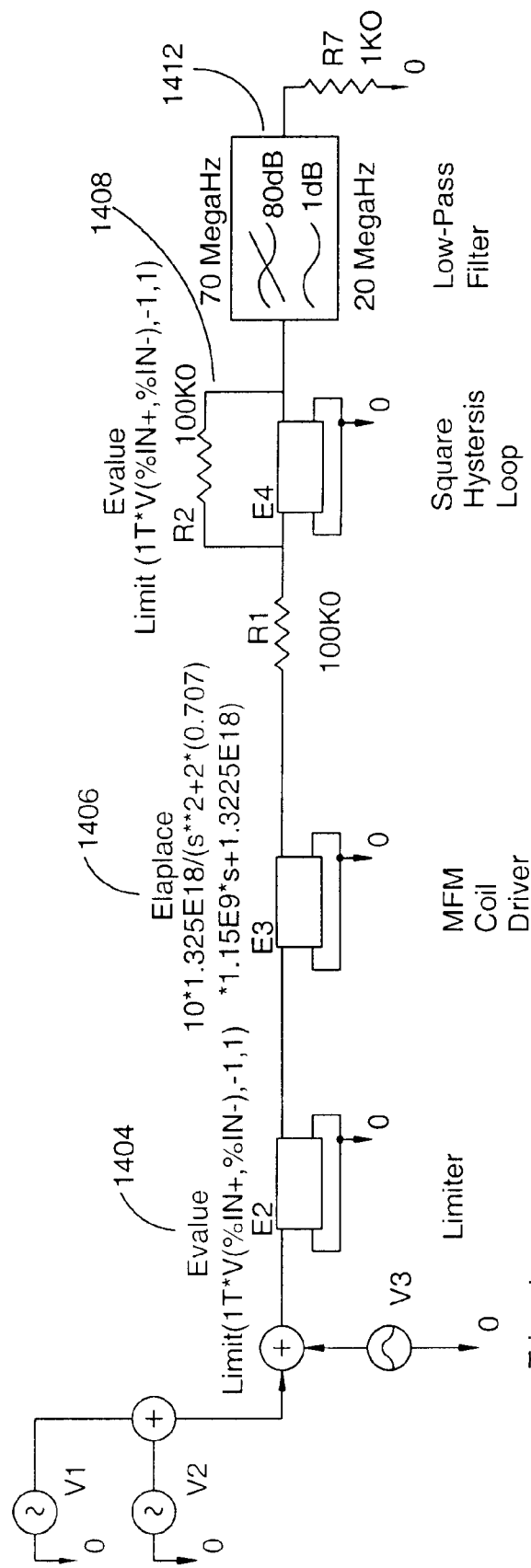
FIG. 17 is a block diagram of a representative circuit for providing duty cycle modulation of a linear data signal prior to conventional write signal processing.

In FIG. 17, the other blocks model. "EE LaPlace" simply means a LaPlace transform model, a two-pole model to simulate the finite rise time of a write current driving a coil. In the next model the square hysteresis loop is another model in that it consists essentially of a limiter with some feedback. This models the hysteresis of the square loop of the storage disc where the data is stored as shown in FIG. 5.

In the exemplary embodiment of FIG. 17, the write circuitry comprises a triangle wave generator 1402 which may be designed as described above and whose output drives an electronic limiter 1404.

In conventional saturation recording the "write" coils is driven by two-level current driver designed to have minimum rise and fall times between the two saturation levels. An alternative realization of the DCM linearization concept would be to use the two-level current driver and duty-cycle modulate the two-level current drive to the "writer" coil. In the simulation block diagrams of FIGS. 6 and 13 this would amount to inserting a zero-hysteresis electronic limiter prior to driving the limiter with hysteresis that represented the "write" process. FIG. 17 illustrates the accomplishment of duty-cycle modulation in an electronic limiter prior to driving the conventional "write" amplifier.

The low-pass filter 1410 is utilized to recover the linearized analog signal. It sum, a preferred embodiment of this invention would be to create a triangle wave of voltage, run that into an electronic limiter as shown and let that limiter drive a conventional bridge current driver to the head to record the duty cycle modulated signal on the disc. Recovery would be achieved with a low pass filter.

Figure 18:
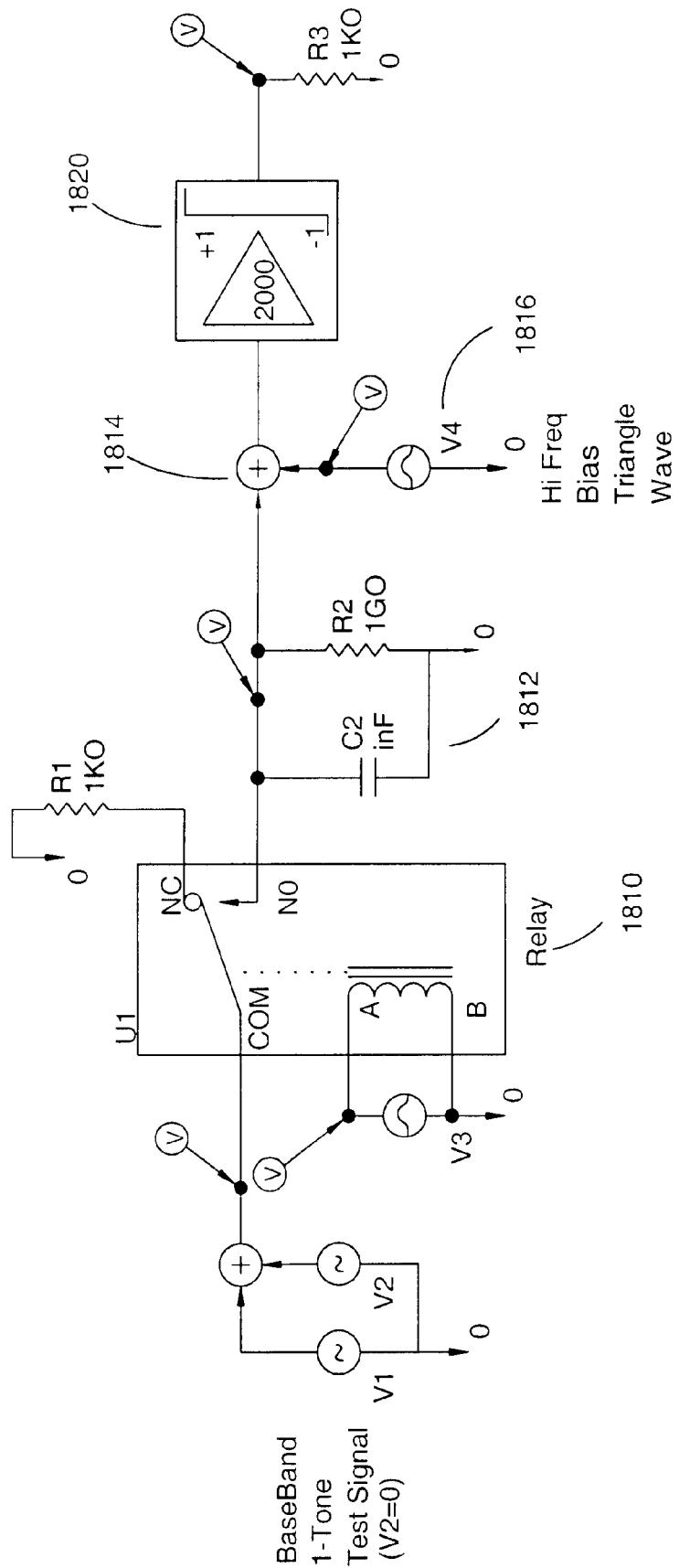
FIG. 18 is a schematic diagram of a sample and hold circuit.

In a highly useful alternative embodiment, insertion of a sample and hold unit that is synchronous with the triangle wave reduces the level of spurious signal generation and enables the bias frequency (frequency of the triangle wave) to be lowered; that is a desirable implementation so as to lower the frequency requirement in the electronics. FIG. 18 is a functional diagram showing an idealized switch, with two-tone signals V1, V2 generated 1801, as before, although in this example one tone V2 has 0 amplitude so in essence generator 1801 is a one tone generator. The sample and hold is based on the sample pulses in FIG. 19. The sample time period is set by the signal V3 controlling the relay 1810, with the sampled signal being stored 1812 at a store unit designed to store as rapidly as possible. That stored signal 1812 is summed 1814 with the triangle wave 1816 and that summation as before goes into the limiter 1820 to create the waveform that is stored; on recovery, it can be low pass filtered to recover the analog waveform as before.

Figure 19A:
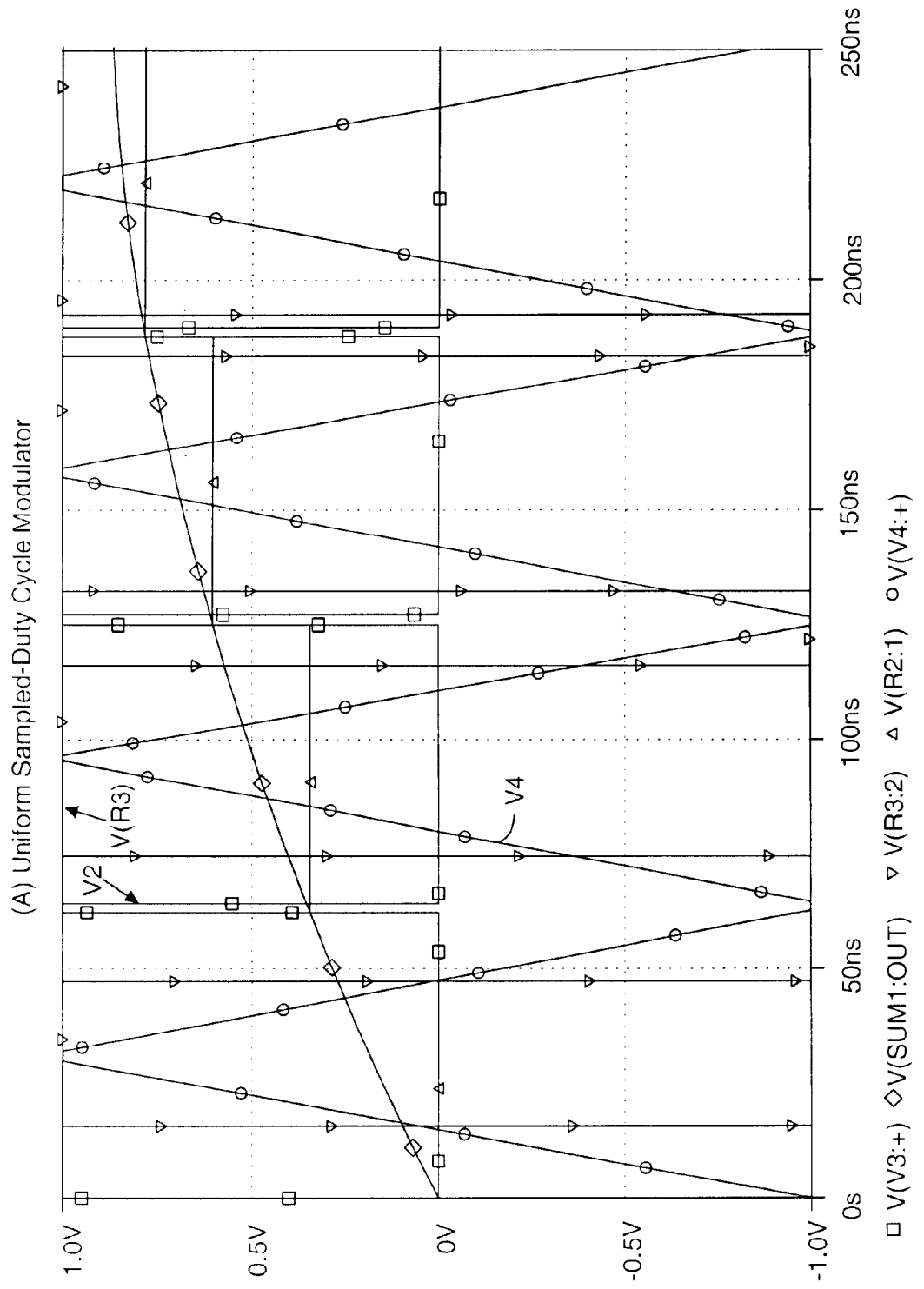
FIGS. 19a–19c show waveforms created by the sample and hold circuit.
Figure 19B:
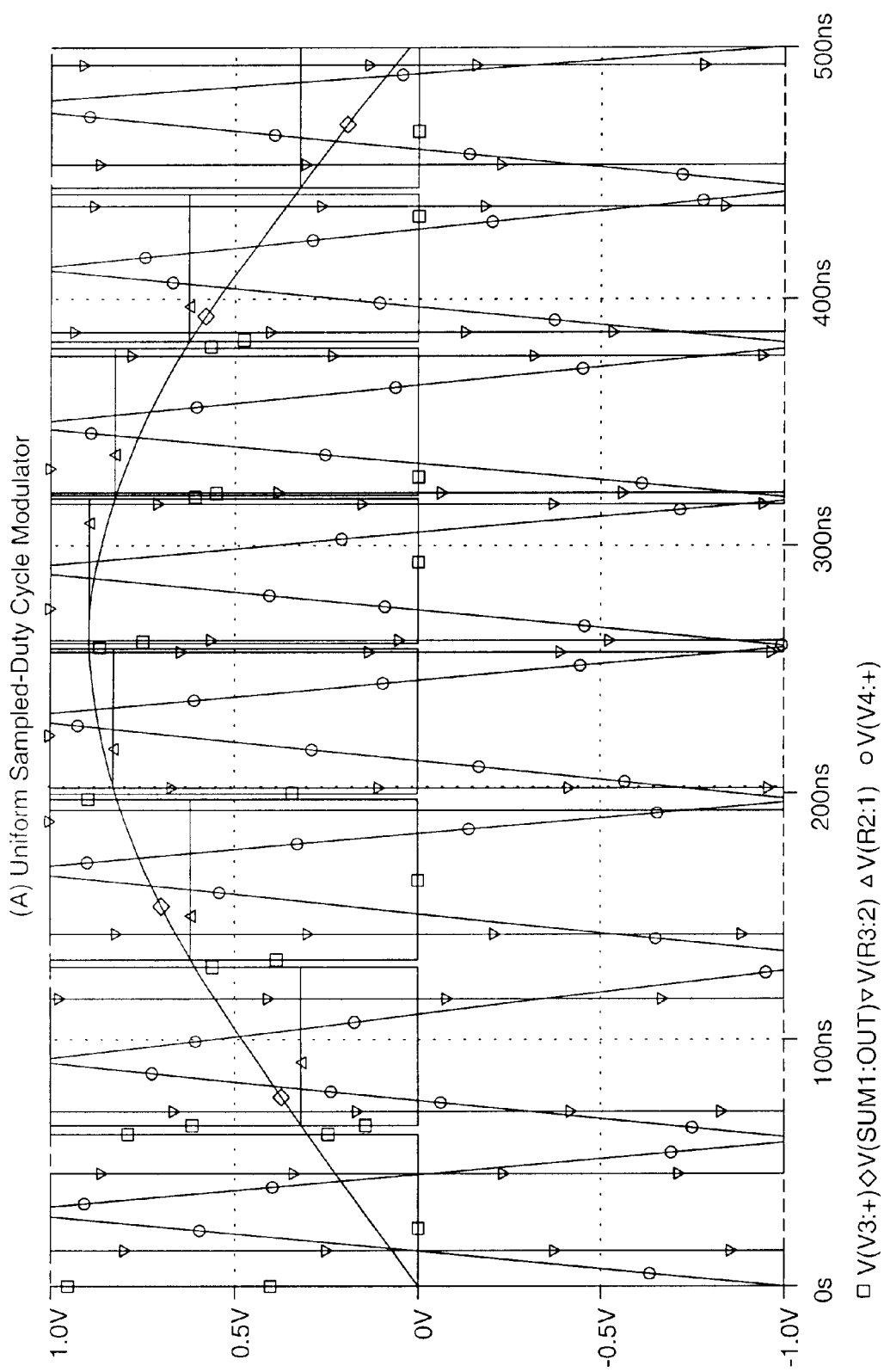
Figure 19C:
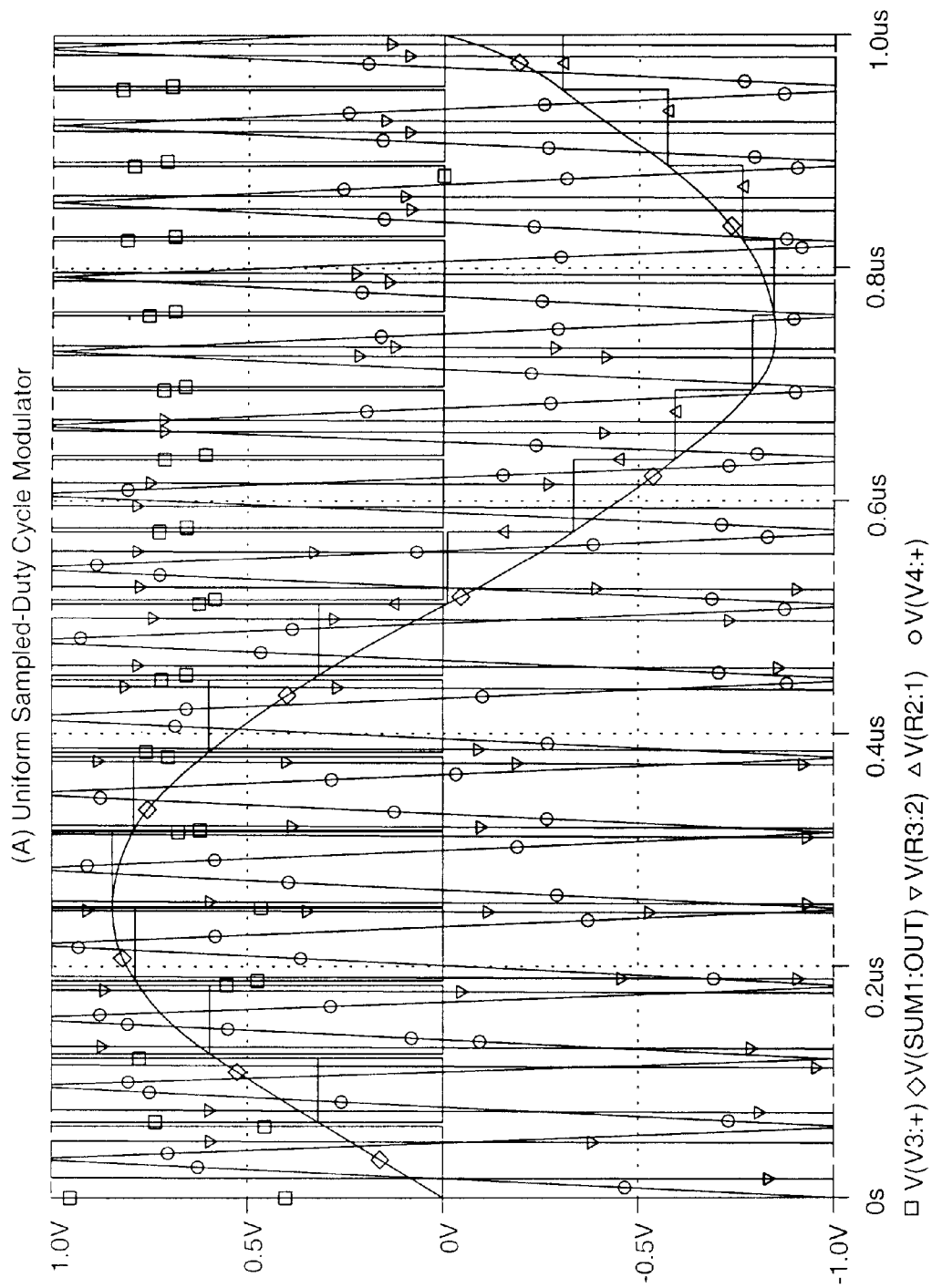

FIG. 19a shows the result of the sample and hold; the aperture time is set by the time the pulse V3 is high, and it closes when that pulse V3 goes low; the waveform of the control pulse is shown in the FIG. 18. Pulse V3 is synchronous with the triangle wave V4; this triangle wave is algebraically added to the sample and hold output and applied to the limiter 1820 producing the output VLR$_3$. So the limiter crosses over in proportion to the sum of the triangle wave plus the held wave; the zero crossing of the sum flips the polarity of this limiter output. What results is a pulse with duty cycle modulation as before in the primary embodiment; but the advantage of this is that analog waveforms that are at higher frequencies relative to the sample rate or the bias frequency as shown by the triangle wave do not have a symmetric pulse with modulations on them; but by use of this technique they are exactly symmetric because the analog voltage being sampled is held for the duration that the triangle wave is passing through this held region, and by doing so it reduces the phase modulation in the pulse width that in turn causes spurious responses. By reducing those spurs the frequency of the bias relative to the analog information is lower, creating a system that is more efficient and easier to implement in electronics. The trade-off is in implementation. A sample and hold adds a little bit of circuit complexity; circuit-wise, it puts more pressure on the electronics, but takes the pressure off of the head-disk interface. It should be noted in the FIG. 19a that the gate control pulse is synchronous with the triangle wave, the timing is set so that the triangle wave is flat over the same width of the pulse that controls the aperture time of the sample and hold. Thus the stored signal follows the sine wave for the duration of the aperture width, and then holds that voltage accurately. FIGS. 19b and 19c show a greater portion of the waveform and then the entire cycle of the waveform respectively.

Peak signal power is about 7 to 8 dB larger than the average signal power in bandwidth efficient communications such as in QAM and spread spectrum. Like speech their amplitude distributions tend to be similar to noise with at or near the peaks occurring only rarely. the duty-cycle modulator (DCM) linearizes the saturation magnetic recording channel, but the peak signal is still limited by the maximum saturation output of the magnetic medium. Consequently, in a further alternative embodiment, it is desirable to suppress rarely occurring peak amplitude prior to entering the DCM of FIG. 17 with a compressor circuit and to perform the inverse by an expandor on the output of the linearized analog playback response. The compressor-expandor functions form the familiar compandor. It maximizes the utilization of the available linear dynamic range and SNR of the DCM linearized magnetic recording channel.

Figure 20:
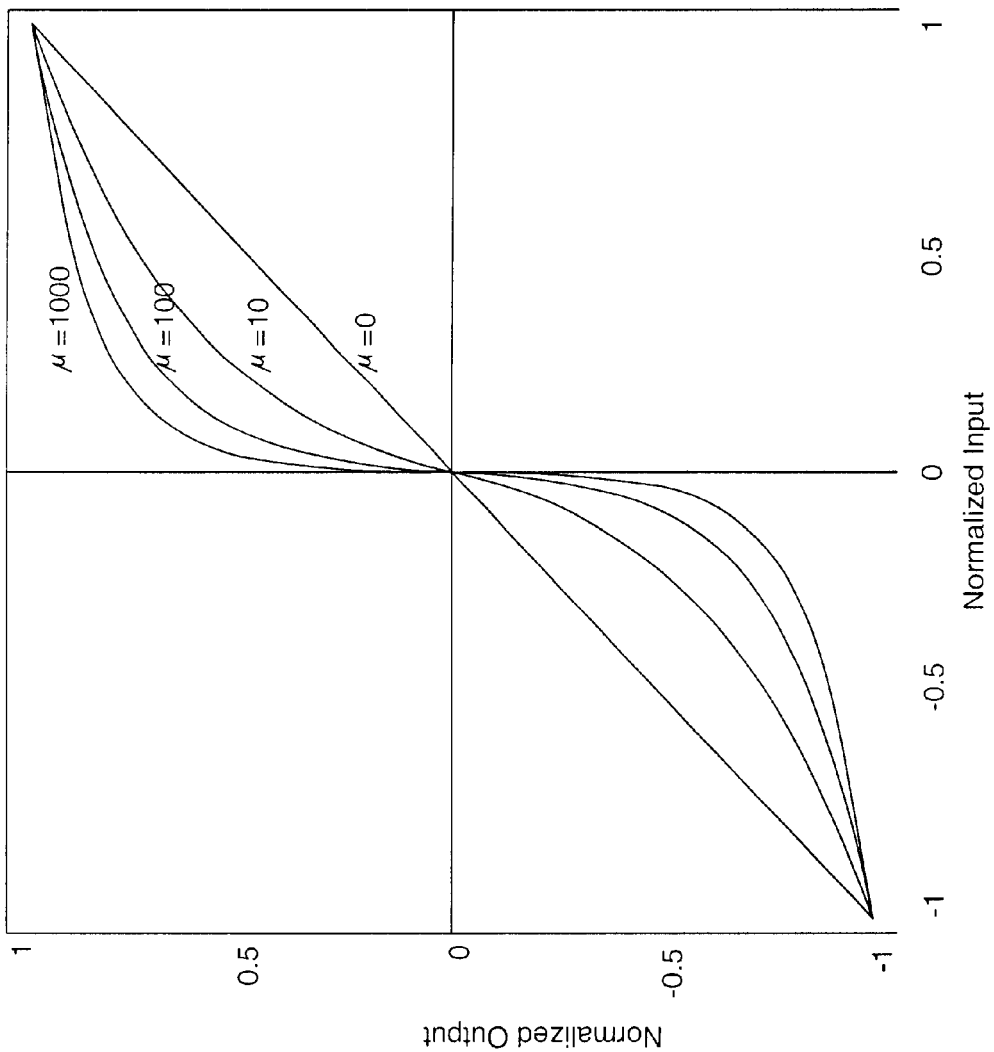
FIG. 20 illustrates the compressor input-output characteristic.

The normalized logarithmic compressor, and by inversion the normalized exponential expandor functions are illustrated in FIG. 20. The expandor is simply the inverse of the compressor.

The logarithmic compressor has an input-output characteristic of the form $$y = sign(x) \frac{\log_e(1 + \mu|x|)}{\log_e(1 + \mu)},$$

where x is the normalized input and y is the normalized output. FIG. 20 illustrates the compressor characteristic for several values of $\mu$. The value $\mu=0$ corresponds to no compression. Similarly, the exponential expandor is described by $$x = sign(y) \frac{(1 + \mu)e^{|y|} - 1}{\mu},$$

Transition jitter may be viewed as an undesired random quantization error applied to the intended duty cycle modulated transition. Compression of the signal peaks closer to the signal average helps restore a greater average SNR through the linearization process and reduces the required dynamic range to handle the rarely occurring signal peaks.

The value of $\mu$ is determined by the statistics of the signal and the degree of subsequent quantization; for uniformly quantized speech, $\mu=255$, results in the best SNR enhancement.

The use of a compressor on the input signal peaks to the duty cycle modulator more efficiently utilizes the available dynamic range. The average SNR will more nearly approach the maximum SNR available through the DCM. The expandor after playback inverts the process to restore the signal for further processing in the demodulation process.

Initially, these are viewed as non-linear analog circuit elements. However, in the future a digital implementation in both the modulator and demodulator may be attractive.

Media transition noise remains the dominant noise contributor and performance limitation. This technique brings the peak SNR requirement more in line with the average SNR requirement.

Other features and advantages of the invention would be apparent to a person of skill in the art who studies this disclosure. Therefore, the scope of the invention is to be limited only by the following claims.

What is claimed is:

1. A data storage system comprising:

a medium for storing a recording signal;

a linear recording channel coupled to the medium for receiving a plurality of supplied digital bits and for recording a linear signal representative of the supplied digital bits onto the medium, the linear signal comprising a sum of the digital bits and a an approximately triangular waveform;

the linear recording channel comprising a compressor circuit for compressing peak amplitude of the signal coupled to an input of a duty cycle modulator whose output is the linear signal; and a linear playback channel comprising a low pass filter coupled to the medium for reproducing the supplied digital bits.

2. The data storage system of claim 1, wherein the linear recording channel further comprises an AC bias circuit coupled to the modulator, where the AC bias circuit is for converting a modulating signal to a linear signal.

3. The data storage system of claim 1, wherein the modulator comprises a quadrature amplitude modulator.

4. The data storage system of claim 1, wherein the medium comprises a recording medium having a substantially rectangular magnetic flux versus magnetic field intensity hysteresis characteristic and a substantially rectangular Kerr rotation versus magnetic field intensity hysteresis characteristic.

5. The data storage system of claim 4, wherein the medium comprises a recording medium having a substantially abrupt flux transition.

6. The data storage system of claim 1, wherein the linear recording channel further comprises:

a sample and hold unit for storing a sample of the input data signal and summing it with the triangular waveform to establish a summation signal that is stored on the medium.

7. The data storage system of claim 6, wherein the sample and hold unit operates synchronously with the triangular waveform to create the summed signal to be stored whereby the bias frequency of the triangular wave is lowered.

8. The data storage system of claim 7 wherein the summation signal is applied to a limitor whose output in turn is stored on the medium.

* * * * *